(12) United States Patent
Saito

(10) Patent No.: US 11,576,084 B2
(45) Date of Patent: Feb. 7, 2023

(54) RESOURCE MANAGEMENT SYSTEM, RESOURCE MANAGEMENT DEVICE, AND NON-TRANSITORY RECORDING MEDIUM

(71) Applicant: Ryuichi Saito, Tokyo (JP)

(72) Inventor: Ryuichi Saito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/326,817

(22) Filed: May 21, 2021

(65) Prior Publication Data

US 2021/0392550 A1 Dec. 16, 2021

(30) Foreign Application Priority Data

Jun. 12, 2020 (JP) .............................. JP2020-102317

(51) Int. Cl.
*H04L 67/75* (2022.01)
*H04W 28/26* (2009.01)
(Continued)

(52) U.S. Cl.
CPC ........ *H04W 28/26* (2013.01); *H04B 7/15528* (2013.01); *H04L 63/083* (2013.01);
(Continued)

(58) Field of Classification Search
CPC .................. H04W 28/26; H04W 84/12; H04B 7/15528; H04L 63/083; H04L 63/102; H04L 67/75;
(Continued)

(56) References Cited

U.S. PATENT DOCUMENTS 10,715,458 B1 * 7/2020 Cahill .................... H04L 67/146
10,783,235 B1 * 9/2020 Agarwal ................. G06F 21/31
(Continued)

FOREIGN PATENT DOCUMENTS

JP    2009-217706    9/2009
JP    2013-061929    4/2013
(Continued)

OTHER PUBLICATIONS

Chen et al., "The design of multimedia conference system based on SIP", Jan. 10, 2010, 2010 International Conference on Computer Application and System Modeling (ICCASM 2010) (vol. 4, pp. V4-577-V4-579) (Year: 2010).*

Parsons et al., "IEEE Recommended Practice for Network Reference Model and Functional Description of IEEE 802® Access Network", May 31, 2019, IEEE, IEEE Std 802.1CF-2019 (pp. 1-185) (Year: 2019).*

*Primary Examiner* — Davoud A Zand
(74) *Attorney, Agent, or Firm* — IPUSA, PLLC

(57) ABSTRACT

A resource management system includes a resource management device that manages a usage of a resource, a reservation management device that manages a reservation for the resource, and a communication relay device that communicates with the resource management device. The resource management device receives reservation information transmitted from the reservation management device. The reservation information is information on the reservation for the resource. The resource management device transmits, to the communication relay device, a request for identification information identifying the communication relay device. The resource management device receives the identification information, which is transmitted from the communication relay device in response to the request. The identification information is used to execute an event associated with the reservation information. The resource management (Continued)

agement device transmits, to an operation display terminal that displays a usage status of the resource, the identification information and a password that is associated with the identification information.

9 Claims, 18 Drawing Sheets

(51) Int. Cl.
    *H04B 7/155*     (2006.01)
    *H04L 9/40*     (2022.01)
    *H04W 84/12*     (2009.01)

(52) U.S. Cl.
    CPC ............ *H04L 63/102* (2013.01); *H04L 67/75* (2022.05); *H04W 84/12* (2013.01)

(58) Field of Classification Search
    CPC ..... H04L 67/26; H04L 67/2809; H04L 67/32; H04L 67/55; H04L 67/562; H04L 67/60; H04L 67/62; H04L 67/63; G06Q 10/1093; G06Q 10/1095
    See application file for complete search history.

(56) References Cited

U.S. PATENT DOCUMENTS

| | | | |
|---|---|---|---|
| 2010/0223385 A1* | 9/2010 | Gulley | H04L 67/32 718/104 |
| 2017/0006162 A1* | 1/2017 | Bargetzi | H04M 3/565 |
| 2017/0344703 A1* | 11/2017 | Ansari | H04L 67/565 |
| 2018/0336524 A1* | 11/2018 | Van Os | G06Q 10/1095 |
| 2020/0348973 A1* | 11/2020 | Kutch | H04L 41/046 |
| 2021/0011704 A1 | 1/2021 | Saito | |
| 2021/0012249 A1 | 1/2021 | Saito | |
| 2021/0390515 A1* | 12/2021 | Tomosugi | G06K 7/1417 |

FOREIGN PATENT DOCUMENTS

| | | |
|---|---|---|
| JP | 2016-004511 | 1/2016 |
| JP | 2018-190414 | 11/2018 |

* cited by examiner

FIG. 6

RESOURCE ID: a001@meeting.com (MEETING ROOM A)

| RESERVA-TION ID | RESERVATION-MAKING USER ID | START DATE AND TIME | END DATE AND TIME | EXPECTED PARTICIPANT ID |
|---|---|---|---|---|
| 001 | a@ricoh.ex.com | 2020/06/12 10:00 | 2020/06/12 11:00 | b@ricoh.ex.com c@ricoh.ex.com |
| 002 | aa@ricoh.ex.com | 2020/06/12 11:00 | 2020/06/12 12:00 | d@ricoh.ex.com e@ricoh.ex.com |
| ... | ... | ... | ... | ... |

FIG. 7A

| URI | API Key |
|---|---|
| http://xxx.xxx.xxx.xxx | abcdefghijklmnopqrstuvwxyz |

FIG. 7B

| RESERVA-TION ID | RESERVATION-MAKING USER ACCOUNT | EVENT NAME | RESOURCE ID | START DATE AND TIME | END DATE AND TIME | EXPECTED PARTICIPANT ACCOUNT | STATUS |
|---|---|---|---|---|---|---|---|
| 001 | a@ricoh.ex.com | PRODUCT Z DEVELOP-MENT MEETING | a001@meeting.com | 2020/06/12 10:00 | 2020/06/12 11:00 | b@xfood.com c@xfood.com d@xfood.com | CHECKED IN |
| 002 | e@ricoh.ex.com | PRODUCT Y DEVELOP-MENT MEETING | a002@meeting.com | 2020/06/12 11:00 | 2020/06/12 12:00 | f@xfood.com g@xfood.com | INFORMED |
| ... | ... | ... | ... | ... | ... | ... | ... |

FIG. 7C

| RESERVA-TION ID | RESOURCE ID | EVENT IDENTIFICATION |
|---|---|---|
| 001 | a001@meeting.com | 1234 |
| 002 | a002@meeting.com | 5678 |
| ... | ... | ... |

FIG. 8A

| SSID | PASSWORD | CHARACRER TYPE OF PASSWORD | USAGE STATUS | AVAILABLE TIME (MIN) | USAGE END DATE AND TIME |
|---|---|---|---|---|---|
| Wi-Fi_Room_1 | 12345678 | NUMERIC CHARACTERS | IN USE | 30 | 2020/1/10:00 |
| Wi-Fi_Room_2 | ... | NUMERIC CHARACTERS | VACANT | 60 | ... |
| Wi-Fi_Room_3 | ... | ALPHAMERIC CHARACTERS | VACANT | 120 | ... |
| ... | | | | | ... |

FIG. 8B

| RESERVATION-MAKING USER ID | DISPLAY NAME | RESOURCE ID | EVENT NAME | START DATE AND TIME | END DATE AND TIME |
|---|---|---|---|---|---|
| AA@jp.ricoh.com | A-san | a001@meeting.com | MEETING FOR XXX | 2020/06/12 10:00 | 2020/06/12 11:00 |
| BB@jp.ricoh.com | B-san | a002@meeting.com | GROUP MEETING | 2020/06/12 14:00 | 2020/06/12 15:00 |
| CC@jp.ricoh.com | C-san | b001@meeting.com | REGULAR MEETING | 2020/06/15 11:00 | 2020/06/15 12:00 |
| ... | | | | | ... |

RESOURCE MANAGEMENT SYSTEM, RESOURCE MANAGEMENT DEVICE, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-102317, filed on Jun. 12, 2020, in the Japan Patent Office, the entire disclosure of which is hereby incorporated by reference.

BACKGROUND

Technical Field

Embodiments of the present disclosure relate to a resource management system, a resource management device, and a non-transitory recording medium storing instructions for executing a resource management method.

Related Art

There are situations in which a visitor (guest) who visits a facility such as a school, a company, or an office from the outside connects to a network in the facility and uses an apparatus or a server in the facility. In such a situation, a network for guests (guest network) is often provided separately from a network used by the employees or staff in the facility in order to ensure security in the facility.

In order to ensure the security and keep the quality of communications established with the guest network, the guest network should not be provided as being available for all guests who visits the facility, but it is desirable to provide the guest network as being available for limited guests.

There is a known technology that operates an external schedule management server and a guest network creation application in cooperation with each other, registers account information used for the schedule management server in any mobile application, receives the account information when communicating, by a short-range wireless communication, with an information terminal on which the mobile application is installed at a time of starting using a guest Wi-Fi, and determines an available time for the guest Wi-Fi based on schedule information.

SUMMARY

An exemplary embodiment of the present disclosure includes a resource management system including a resource management device that manages a usage of a resource, a reservation management device that manages a reservation for the resource, and a communication relay device that communicates with the resource management device. The resource management device receives reservation information transmitted from the reservation management device. The reservation information is information on the reservation for the resource. The resource management device transmits, to the communication relay device, a request for identification information identifying the communication relay device. The resource management device receives the identification information, which is transmitted from the communication relay device in response to the request. The identification information is used to execute an event associated with the reservation information. The resource management device transmits, to an operation display terminal that displays a usage status of the resource, the identification information and a password that is associated with the identification information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a conceptual diagram illustrating an example of a reservation information management table according to one or more embodiments of the present disclosure;

FIG. 7A is a conceptual diagram illustrating an example of a wireless LAN access point management table according to one or more embodiments of the present disclosure;

FIG. 7B is a conceptual diagram illustrating an example of a resource status management table according to one or more embodiments of the present disclosure;

FIG. 7C is a conceptual diagram illustrating an example of an event identification information table according to one or more embodiments of the present disclosure;

FIG. 8A is a conceptual diagram illustrating an example of a guest network management table according to one or more embodiments of the present disclosure;

FIG. 8B is a conceptual diagram illustrating an example of an event management table according to one or more embodiments of the present disclosure;

Figure 1:
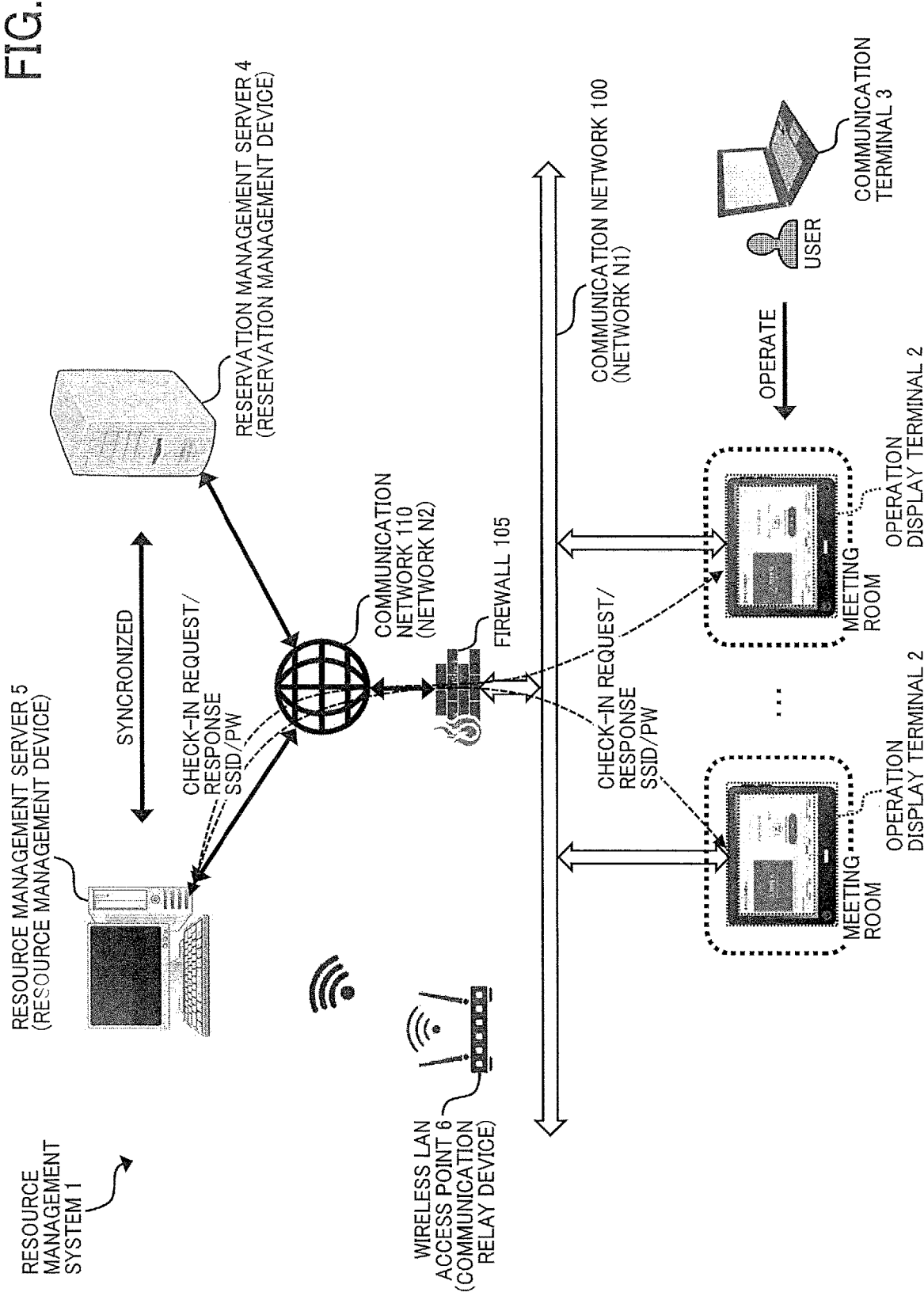
FIG. 1 is a schematic view illustrating an example of a configuration of a resource management system according to one or more embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural foul's as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure are described with reference to the drawings. In the description of the drawings, the same elements are denoted by the same reference numerals, and redundant description is omitted.

Overview of Resource Management System:

A description is given below of one of the embodiments of the present disclosure, with reference to FIG. 1 to FIG. 18.

Example of System Configuration

FIG. 1 is a schematic view illustrating an example of a configuration of a resource management system 1 according to the present embodiment. As illustrated in FIG. 1, the resource management system 1 according to the present embodiment includes, for example, an operation display terminal 2, a communication terminal 3, a reservation management server 4, a resource management server 5, and a wireless Local Area Network (LAN) access point 6. The resource management system 1 having such a configuration is a system that allows a visitor (hereinafter may be referred to as a guest) who visits from the outside to temporarily use the wireless LAN.

The operation display terminal 2 and the communication terminal 3 are connected to each other in a firewall 105 via a communication network 100 (network N1) such as a wired or wireless intra-company network. The reservation management server 4 and the resource management server 5 are connected to the outside of the firewall 105 so as to communicate via a communication network 110 (network N2) such as a wired or wireless LAN, an intranet, or the Internet. The communication network 110 is a network through which an unspecified number of communications are established, and is implemented by the Internet, a mobile communication network, or a LAN, for example. The communication network 110 may include, in addition to a wired communication, a wireless communication in compliance with, for example, 3rd Generation (3G), 4th Generation (4G), 5th Generation (5G), Worldwide Interoperability for Microwave Access (WiMAX), and Long Term Evolution (LTE).

Operation Display Terminal:

The operation display terminal 2 is a terminal that is installed with a general Operating System (OS) and has an operation and display function. The operation display terminal 2 is provided, for example, at an entrance of a resource such as a meeting room (conference room). Alternative to the operation display terminal 2, for example, another communication terminal that has a communication function, such as a tablet terminal, a Personal Computer (PC), a Personal Digital Assistant (PDA), or a wearable PC, which includes a sunglass type and a wristwatch type, may be used. That is, as the operation display terminal 2, a terminal that is capable of executing software such as browser software is used.

Communication Terminal:

Similar to the operation display terminal 2, the communication terminal 3 is also a terminal installed with a general OS and used for communication. The communication terminal 3 is a communication terminal owned by a user including a guest who uses a resource such as a meeting room. The communication terminal 3 is a communication terminal that has a communication function, and examples of the communication terminal 3 includes a portable notebook PC, a tablet terminal, a smartphone, a PDA, and a wearable PC (sunglass type, wristwatch type, etc.). That is, as the communication terminal 3, a communication terminal that is capable of executing software such as browser software is used.

Reservation Management Server:

The reservation management server 4 is a server implemented by a computer system that is one or more information processing devices each of which is implemented with a general server OS or the like, and manages reservations related to each resource made by a user. A system related to managing with the reservation management server 4, including managing a reservation for a resource and managing a reservation or a schedule registered by a user is referred to as a reservation management system. The reservation management server 4 includes a calendar system and provides a web application for managing various schedules of a user. For example, the reservation management server 4 has following functions:

accepting a registration of a reservation or a schedule from a user and enabling the user to check the reservation or the schedule from anywhere at any time;

transmitting a reminder email at a preset date and time, such as 30 minutes before a scheduled time;

enabling the user to manage reservations and schedules by using plural calendars (one for business, another one for family, etc.); and sharing a calendar with other members who belongs to the same group. The reservation management server 4 uses accounts to manage the users.

The account represents a right of a corresponding user to use a service. The account is used in many systems and a user of each system uses his or her account to log in the system. That is, the account has a function of uniquely identifying the corresponding user (function of identification information) for the system. In the present embodiment, the reservation management server 4 transmits reservation information associated with an account (domain) registered in advance to the resource management server 5. Alternatively, the resource management server 5 transmits, to the reservation management server 4, a request for the reservation information by specifying an account used for the reservation management server 4, so that the resource management server 5 acquires the reservation information associated with a meeting room (conference room) from the reservation management server 4. The account may be any suitable information that uniquely identifies a user. Examples of the account include an email address, an identification (ID), and a telephone number.

In the present embodiment, the reservation management server 4 manages reservation information and user schedules. The reservation information includes information on reservations for various types of resources, which include a free space and a meeting room, for example. Although G SUITE (registered trademark), OFFICE 365 (registered trademark), and the like are known as reservation management systems, any other suitable reservation management system having functions described in the present embodiment will suffice.

In addition, in the present embodiment, the reservation management server 4 registers information on various types of resources reserved by each of the users and information on the schedule of each of the users in advance. In other words, the web application of the reservation management server 4 is customized according to a meeting room name, a meeting room ID, a reservation available time, a capacity, a reservation unit, and the like of each meeting room residing within the intra-company network of a company using the resource management system 1. Accordingly, the resources including each meeting room of the company using the resource management system 1 is associated with the reservation information. In the present embodiment, the reservation management server 4 functions as an example of a reservation management device.

Resource Management Server:

The resource management server 5 is a server implemented by a computer system that is one or more information processing devices each of which is implemented with a general server OS or the like.

The resource management server 5 is a server that controls the wireless LAN access point 6 by executing a dedicated application program (hereinafter referred to as a guest network creation application) and transmitting a control signal to the wireless LAN access point 6. The resource management server 5 further makes various settings of the wireless LAN to be used by the guest according to operations of a network administrator who manages the network of the resource management system 1. The resource management server 5 further sets, according to operations of each guest, a usage start date and time and a usage end date and time of the wireless LAN for guests (hereinafter referred to as a guest network). Each of the network administrator and the guest is an example of the user who uses the resource management server 5.

As processing related to the communication network 110 (network N2), the resource management server 5 acquires the reservation information associated with each meeting room and information on the expected participants set in the reservation information from the reservation management server 4 and transmits a notification, at a preset time, to the expected participants and to a related chat server group (or an individual user such as the reservation-making user). Further, as processing related to the communication network 100 (network N1), the resource management server 5 manages check-in (for example, entering a room) and check-out (for example, leaving a room) with respect to each meeting room, or controls a power supply of an electronic apparatus that is provided in each meeting room, based on the reservation information, which is corresponding to the meeting room, acquired from the reservation management server 4. In the present embodiment, the resource management server 5 functions as an example of a resource management device.

The communication network 100 connected to the resource management server 5 includes, for example, each meeting room in a floor space, a workplace for the expected participants, and a workplace for the administrator, and the communication network 110 is accessible by the expected participants via the communication network 100 and the firewall 105. The communication network 100 includes, for example, a LAN. However, each meeting room, the workplace for the expected participants, and the workplace for the administrator are not necessarily in the LAN of the same company.

In addition, the info nation shared by the resource management server 5 is not limited to data representing texts, but includes data also representing such as, for example, images, video images, and sounds. However, in the description of the present embodiment, an example case in which text is mainly used for the notifications, for the sake of explanatory. However, regarding a chat system in the present embodiment, a function of voice chat may be used in communication between the members in the group. The voice chat can be a one-to-one voice chat or a one-to-N voice chat, where N≥2. In other words, when the chat system is used to notify information on the reservation for the resource in the present embodiment, a voice message may be output, in addition to or in alterative to texts displayed. As the chat system, LINE (registered trademark), SLACK (registered trademark), MICROSOFT TEAMS (registered trademark) or the like is known but this is not limiting. Any chat system having a capability of transmitting a notification to one or more users from a bot (a program that executes predetermined processes) will suffice.

Similarly, the resource management server 5 manages users with an account that is different from the account for the reservation management server 4. A meeting management server basically does not need to recognize the account of the resource management server 5. However, the meeting management server can transmit a notification by specifying a desired account for the resource management server 5.

Wireless LAN Access Point:

The wireless LAN access point 6 is an example of a communication relay device that sets up a wireless LAN and mediates communication between the resource management server 5 and the operation display terminal 2, or between other communication devices connected to the wireless LAN access point 6. The wireless LAN access point 6 sets one or more Service Set Identifiers (SSIDs), each of which is an identifier for identifying its own device and further sets a guest network for each SSID. The wireless LAN access point 6 has an interface such as an Application Programming Interface (API) for executing addition or deletion of an SSID in response to a request from the resource management server 5. The deletion is a process of terminating the use of the corresponding SSID. The process includes deleting the SSID from the setting information and disabling the setting, for example. The addition is a process of starting the use of the corresponding SSID. The process includes adding the SSID to the setting information and making the setting effective, which is previously invalidated. In the present embodiment, the SSID is an example of identification information that identifies the corresponding communication relay device.

Terminologies

In the present embodiment, the "resource" is defined as various types of resources owned, rented, or managed by a company, a group, an organization, or the like. The resource of a company, a group, an organization, or the like, includes for example, a meeting room (conference room) and a facility usable in the meeting room, a device, and a worker (reception group). In addition, the resource includes a free space having a free address (hereinafter referred to simply as a free space), a desk, a chair, a place such as a booth, a company car, a bicycle, a parking lot, a bicycle parking lot, a teleconferencing system, and a printing service and mechanism. From among the resources, a resource that is difficult to move is referred to as a "facility". In the description of the present embodiment, for the sake of explanatory convenience, "meeting room", is used as an example of the resource. In addition, examples of the resources include various types of electronic devices, places such as rental offices and rental studios, rental cycles, rental cars (sharing cars), accommodation facilities such as hotels, facilities such as entertainment venues, and rental spaces such as rental lockers.

"Resource usage request" may indicate a request with a required resource identification information. For example, such the request includes a usage start request and a reservation start request.

Further, the "user" includes a person who has reserved a resource such as a free space or a meeting room and an administrator who manages the resource management system 1 according to the present embodiment. The person who has reserved a resource may be referred to as a reservation-making user. In a case that the person who reserved a resource uses the resource, the reservation-making user is the person who uses the resource. A person who uses a resource may be referred to as a user.

In addition, in the present embodiment, the "user" includes a person who corresponds to:

one who made a reservation for the resource;

one who uses the reserved resource; One who participates in an event that is hold in relation to the reserved resource; and one who is invited to the event by one of the above-mentioned persons and participates in the event as a guest member.

In the present embodiment, the term of "user" is used for convenience of explanation.

Figure 2:
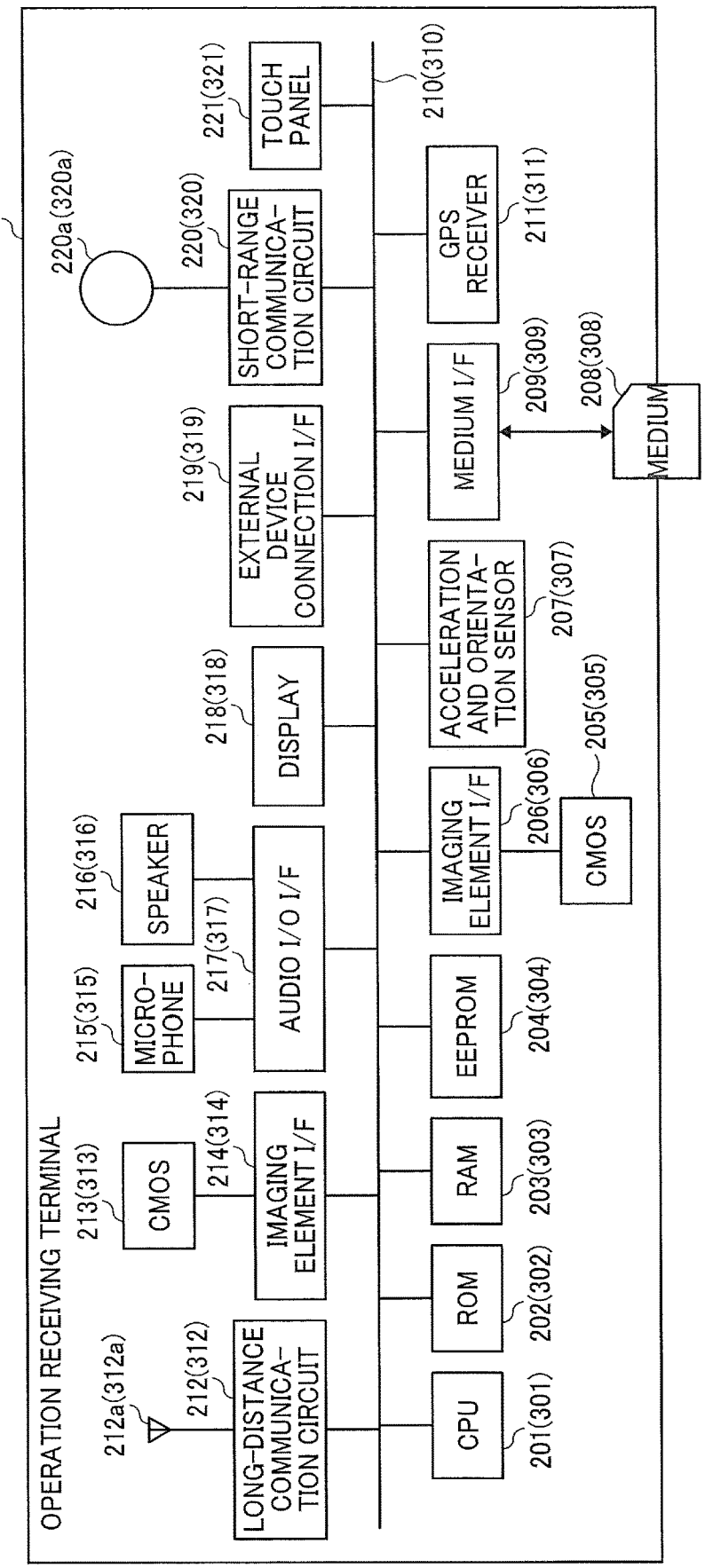
FIG. 2 is a block diagram illustrating an example of a hardware configuration of each of an operation display terminal and a communication terminal according to one or more embodiments of the present disclosure.

Hardware Configuration:

Hardware Configuration of Operation Display Terminal and Communication Terminal:

FIG. 2 is a block diagram illustrating an example of a hardware configuration of each of the operation display terminal 2 and the communication terminal 3 according to the present embodiment. Each of the operation display terminal 2 and the communication terminal 3 is implemented by, for example, a computer system having a hardware configuration as illustrated in FIG. 2.

The computer system illustrated in FIG. 2 is implemented by a computer, and includes a central processing unit (CPU) 201, a read only memory (ROM) 202, a random access memory (RAM) 203, an electrically erasable PROM (EEPROM) 204, a complementary metal oxide semiconductor (CMOS) sensor 205, an image sensor interface (I/F) 206, an acceleration and orientation sensor 207, a medium I/F 209, and a global positioning system (GPS) receiver 211.

Of these, the CPU 201 controls the overall operation of the operation display terminal 2. The ROM 202 stores a control program for operating the CPU 201 such as an Initial Program Loader (IPL). The RAM 203 is used as a work area for the CPU 201. The EEPROM 204 reads or writes various data such as an application under control of the CPU 201. The CMOS sensor 205 is an example of a built-in imaging element that captures an object under control of the CPU 201 to obtain image data or vide data. In alternative to the CMOS sensor 205, an imaging element such as a charge-coupled device (CCD) sensor may be used as an image capturing device. The imaging element I/F 206 is a circuit that drives the CMOS sensor 205. The acceleration and orientation sensor 207 includes various sensors such as an electromagnetic compass or gyrocompass for detecting geomagnetism and an acceleration sensor. The medium I/F 209 reads or writes (stores) data from and to a storage medium 208 such as a flash memory. The GPS receiver 211 receives a GPS signal from a GPS satellite.

The operation display terminal 2 further includes a long-range communication circuit 212, an antenna 212a for the long-range communication circuit 212, a CMOS sensor 213, an imaging element I/F 214, a microphone 215, a speaker 216, an audio input/output (I/O) I/F 217, a display 218, an external device connection I/F 219, a short-range communication circuit 220, an antenna 220a for the short-range communication circuit 220, and a touch panel 221.

The long-range communication circuit 212 is a circuit that enables the operation display terminal 2 to communicate with other devices through the communication network 100. The CMOS sensor 213 is an example of a built-in imaging element that captures an object under control of the CPU 201 to obtain image data. The imaging element I/F 214 is a circuit that drives the CMOS sensor 213. The microphone 215 is a built-in circuit that converts sound into an electric signal. The microphone 215 acquires voice and sound waves emitted from an external speaker, etc., and acquires information using electrical signals. The speaker 216 is a built-in circuit that generates audio such as music or voice by converting an electric signal into physical vibration. The audio input/output I/F 217 is a circuit for inputting or outputting an audio signal between the microphone 215 and the speaker 216 under control of the CPU 201. The display 218 is an example of a display device that displays an image of the object, various icons, etc. Examples of the display 218 include a Liquid Crystal Display (LCD) and an organic electroluminescence (EL) display. The external device connection I/F 219 is an interface that connects the operation display terminal 2 to various external devices. The short-range communication circuit 220 is a communication circuit that communicates in compliance with the Near Field Communication (NFC), the Bluetooth, or the like. The touch panel 221 is one example of an input device that allows a user to operate the operation display terminal 2 by performing a user operation. Examples of the user operation includes operations of pressing, clicking, and tapping performed with respect to a screen of the display 218.

The operation display terminal 2 further includes a bus line 210. The bus line 210 is an address bus or a data bus that electrically connects the elements illustrated in FIG. 2, such as the CPU 201, to each other.

The communication terminal 3 is implemented by a computer, and as illustrated in FIG. 2, includes a CPU 301, a ROM 302, a RAM 303, an EEPROM 304, a CMOS sensor 305, an imaging element I/F 306, an acceleration and orientation sensor 307, a medium I/F 309, a GPS receiver 311, a long-range communication circuit 312, an antenna 312a for the long-range communication circuit 312, a CMOS sensor 313, an imaging element I/F 314, a microphone 315, a speaker 316, an audio input/output (I/O) I/F 317, a display 318, an external device connection I/F 319, a short-range communication circuit 320, an antenna 320a for the short-range communication circuit 320, and a touch panel 321. The above-mentioned elements of the communication terminal 3 have substantially the same configuration of the elements in the operation display terminal 2, the CPU 201, the ROM 202, the RAM 203, the EEPROM 204, the CMOS sensor 205, the imaging element I/F 206, the acceleration and orientation sensor 207, the medium I/F 209, the GPS receiver 211, the long-range communication circuit 212, the antenna 212a for the long-range communication circuit 212, the CMOS sensor 213, the imaging element I/F 214, the microphone 215, the speaker 216, the audio input/output I/F 217, the display 218, the external device connection I/F 219, the short-range communication circuit 220, the antenna 220a for the short-range communication circuit 220, and the touch panel 221. Accordingly, a redundant description thereof is omitted.

Figure 3:
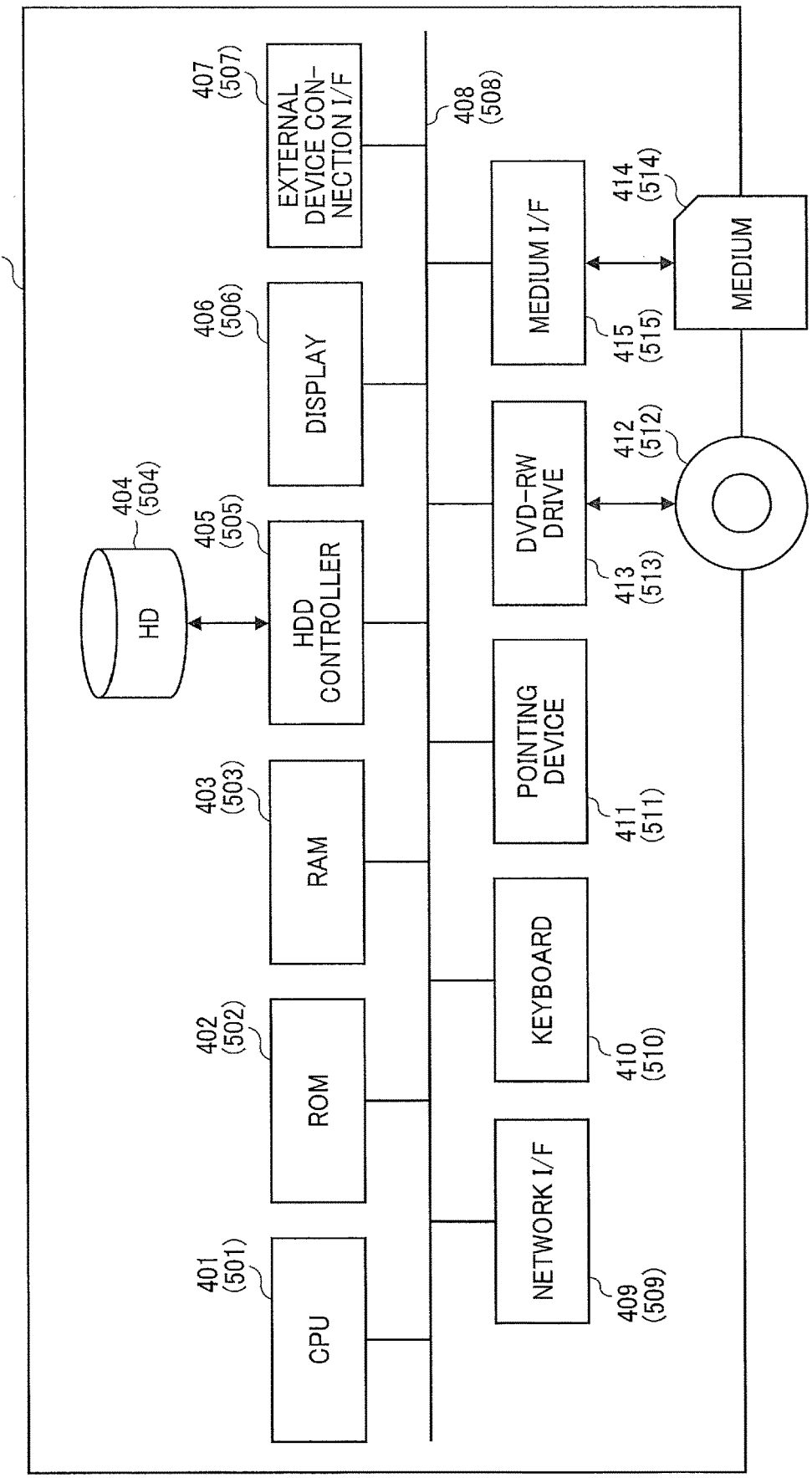
FIG. 3 is a block diagram illustrating an example of a hardware configuration of each of a reservation management server and a resource management server according to one or more embodiments of the present disclosure.

Hardware Configuration of Reservation Management Server and Resource Management Server:

FIG. 3 is a block diagram illustrating an example of a hardware configuration of each of the reservation management server 4 and the resource management server 5 according to the present embodiment. Each of the reservation management server 4 and the resource management server 5 is implemented by, for example, a computer system having a hardware configuration as illustrated in FIG. 3.

The computer system illustrated in FIG. 3 is implemented by a computer, and includes a CPU 401, a ROM 402, a RAM 403, a Hard Disk (HD) 404, a Hard Disk Driven (HDD) controller 405, a display 406, an external device connection I/F 407, a bus line 408, a network I/F 409, a keyboard 410, a pointing device 411, a Digital Versatile Disk Rewritable (DVD-RW) drive 413, and a medium I/F 415.

Of these, the CPU 401 controls the operation of the entire computer system. The ROM 402 stores a control program for controlling the CPU 401 such as an IPL. The RAM 403 is used as a work area for the CPU 401. The HD 404 stores various data such as a control program. The HDD controller 405 reads or writes various data from and to the HD 404 under control of the CPU 401. The display 406 displays various information such as a cursor, a menu, a window, a character, or an image. The external device connection I/F 407 is an interface for connecting to various external devices. The external device is, for example, a Universal Serial Bus (USB) memory or a printer. The network I/F 409 is an interface for data communication by using the communication network 110. The bus line 408 is an address bus or a data bus that electrically connects the elements illustrated in FIG. 3, such as the CPU 401, to each other.

The keyboard 410 is an example of an input device provided with a plurality of keys for allowing a user to input characters, numerals, or various instructions. The pointing device 411 is an example of an input device that allows a user to select or execute a specific instruction, select a target for processing, or move a cursor being displayed. The DVD-RW drive 413 reads and writes various data from and to a DVD-RW 412, which is an example of a removable recording medium (removable storage medium). The removable recording medium (removable storage medium) is not limited to the DVD-RW and may be a digital versatile disk-recordable (DVD-R) or the like. The medium I/F 415 reads and writes (stores) data from and to a storage medium 414 such as a flash memory.

The resource management server 5 is implemented by a computer, and as illustrated in FIG. 3, includes a CPU 501, a ROM 502, a RAM 503, an HD 504, an HDD controller 505, a display 506, an external device connection I/F 507, a bus line 508, a network I/F 509, a keyboard 510, a pointing device 511, a DVD-RW drive 513, and a medium I/F 515. The above-mentioned elements of the resource management server 5 are substantially the same as the elements of the reservation management server 4, the CPU 401, the ROM 402, the RAM 403, the HD 404, the HDD controller 405, the display 406, the external device connection I/F 407, the bus line 408, the network I/F 409, the keyboard 410, the pointing device 411, the DVD-RW drive 413, and the medium I/F 415, respectively. Accordingly, a redundant description thereof is omitted.

Figure 4:
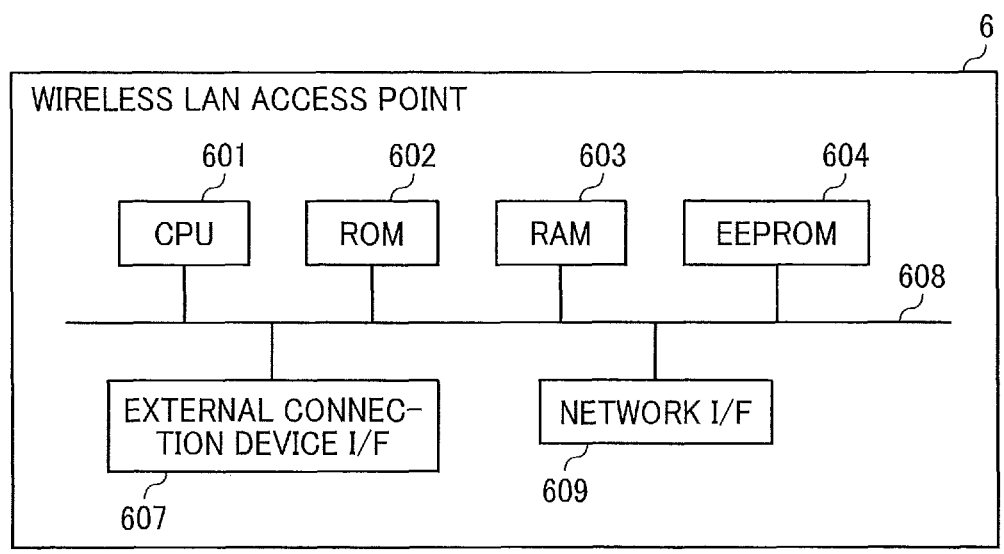
FIG. 4 is a block diagram illustrating an example of a hardware configuration of a wireless Local Area Network (LAN) access point according to one or more embodiments of the present disclosure.

Hardware Configuration of Wireless LAN Access Point:

FIG. 4 is a block diagram illustrating an example of a hardware configuration of the wireless LAN access point 6 according to the present embodiment. The wireless LAN access point 6 is implemented by, for example, a computer system having a hardware configuration as illustrated in FIG. 4.

The computer system illustrated in FIG. 4 is implemented by a computer and includes a CPU 601, a ROM 602, a RAM 603, an EEPROM 604, an external device connection I/F 607, a bus line 608, and a network I/F 609.

Of these, the CPU 601 controls the operation of the entire computer system. The ROM 602 stores a program such as an initial program loader (IPL) used for driving the CPU 601. The RAM 603 is used as a work area for the CPU 601. The EEPROM 604 reads or writes various data such as an application under control of the CPU 601. The external device connection I/F 607 is an interface for connecting various external devices. The external devices include, for example, the operation display terminal 2, the resource management server 5, and the like. The network I/F 609 is an interface for data communication by using the communication network 100 (network N1) or the communication network 110 (network N2). Examples of the bus line 608 include, but not limited to, an address bus and a data bus, which electrically connects the components illustrated in FIG. 4 such as the CPU 601.

Figure 5:
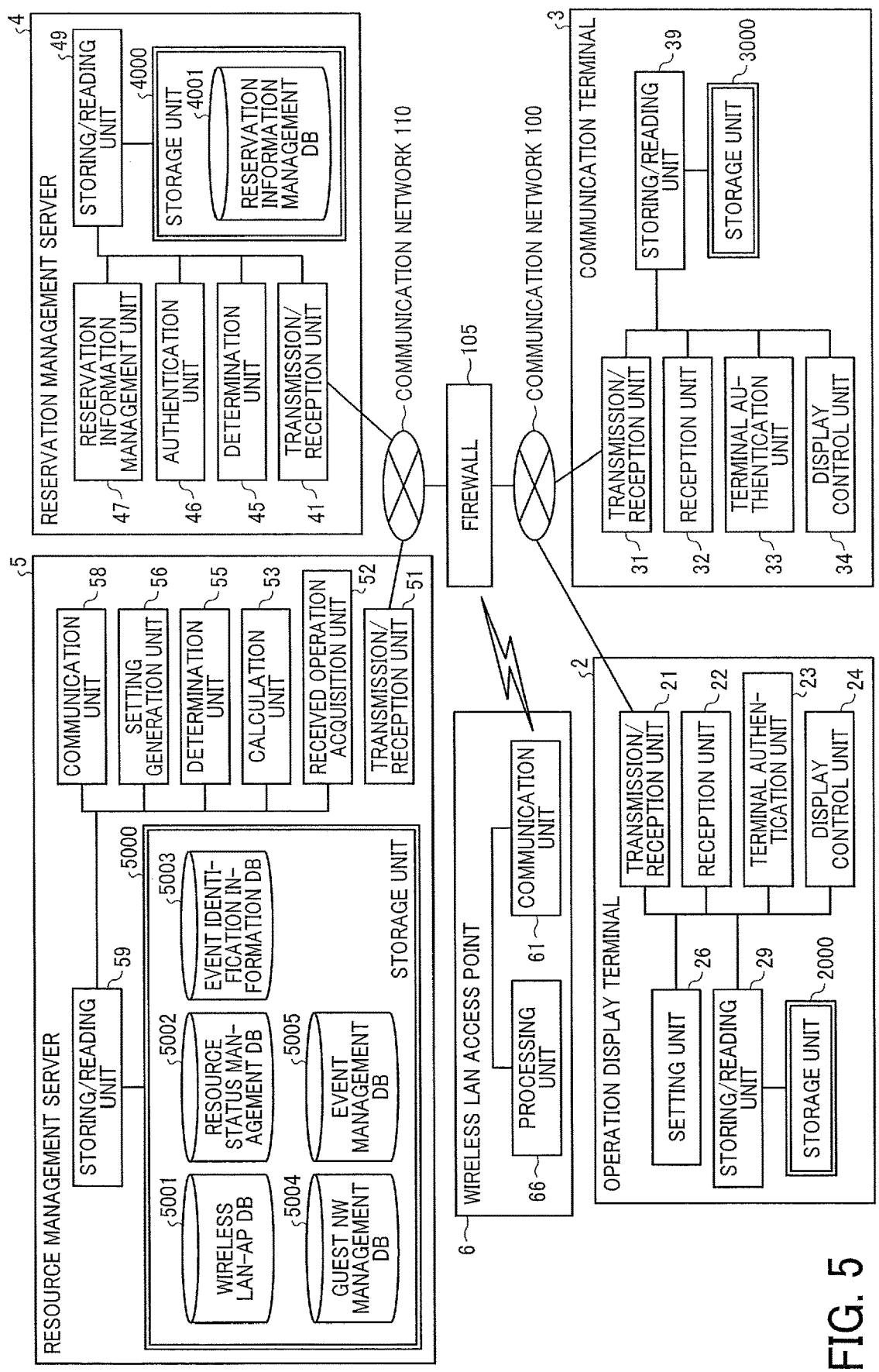
FIG. 5 is a block diagram illustrating an example of a functional configuration of a resource management system according to one or more embodiments of the present disclosure.

Functional Configuration of Resource Management System:

A description is now given of a functional configuration of a resource management system according to the present embodiment, with reference to FIG. 5 to FIG. 8 (FIG. 8A and FIG. 8B). FIG. 5 is a block diagram illustrating an example of a functional configuration of the resource management system 1 according to the present embodiment.

Functional Configuration of Operation Display Terminal:

As illustrated in FIG. 5, the operation display terminal 2 includes a transmission/reception unit 21, a reception unit 22, a terminal authentication unit 23, a display control unit 24, a setting unit 26, and a storing/reading unit 29. These units are functions that are implemented by or that are caused to function by operating any of the hardware elements illustrated in FIG. 2 in cooperation with the instructions of the CPU 201 according to the program dedicated to the operation display terminal 2 expanded to the RAM 203 from at least one of the ROM 202 and the EEPROM 204.

The operation display terminal 2 further includes a storage unit 2000 that is implemented by the ROM 202 or the EEPROM 204 illustrated in FIG. 2.

Functional Units of Operation Display Terminal:

A detailed description is given below of each functional unit of the operation display terminal 2. The transmission/reception unit 21 of the operation display terminal 2 illustrated in FIG. 5 is mainly implemented by processing of the CPU 201 illustrated in FIG. 2, the long-range communication circuit 212, and the external device connection I/F 219 illustrated in FIG. 2. The transmission/reception unit 21 transmits or receives various data or various information to or from the reservation management server 4 or the resource management server 5 via the communication network 100.

The reception unit 22 is mainly implemented by processing of the CPU 201 and processing of the touch panel 221 illustrated in FIG. 2 and receives various selections or inputs from the user. In addition to, or in alternative to the touch panel 221, another input device such as an operation key may be used.

The display control unit 24 is mainly implemented by processing of the CPU 201 and the display 218 illustrated in FIG. 2, and causes the display 218 to display various images, characters, code information, or the like.

The setting unit 26 is mainly implemented by processing of the CPU 201 illustrated in FIG. 2 and makes various settings for the operation display terminal 2.

The storing/reading unit 29 is mainly implemented by processing of the CPU 201 illustrated in FIG. 3 and stores various data (or information) in the storage unit 2000 or reads various data (or information) from the storage unit 2000.

Functional Configuration of Communication Terminal:

As illustrated in FIG. 5, the communication terminal 3 includes a transmission/reception unit 31, a reception unit 32, a terminal authentication unit 33, a display control unit 34, and a storing/reading unit 39. These units are functions that are implemented by or that are caused to function by operating any of the hardware elements illustrated in FIG. 2 in cooperation with the instructions of the CPU 301 according to the program dedicated to the communication terminal 3 expanded to the RAM 303 from at least one of the ROM 302 and the EEPROM 304.

The communication terminal 3 further includes a storage unit 3000 implemented by the ROM 302 or the EEPROM 304 illustrated in FIG. 2.

Functional Units of Communication Terminal:

A detailed description is given below of each functional configuration of the communication terminal 3. The transmission/reception unit 31 of the communication terminal 3 illustrated in FIG. 5 is mainly implemented by processing of the CPU 301 illustrated in FIG. 2, the long-range communication circuit 312, and the external device connection I/F 319 illustrated in FIG. 2. The transmission/reception unit 31 transmits or receives various data or various information to or from the reservation management server 4 or the resource management server 5 via the communication network 100.

The reception unit 32 is mainly implemented by processing of the CPU 301 and processing of the touch panel 321 illustrated in FIG. 2 and receives various selections or inputs from the user. In addition to, or in alternative to the touch panel 321, another input device such as an operation key may be used.

The terminal authentication unit 33 is mainly implemented by processing of the CPU 301 illustrated in FIG. 2, and, for example, authenticates a login to a terminal application executed by the communication terminal 3 based on whether the entered password is correct or not.

The display control unit 34 is mainly implemented by processing of the CPU 301 and the display 318 illustrated in FIG. 2, and causes the display 318 to display various images, characters, code information, or the like.

The storing/reading unit 39 is mainly implemented by processing of the CPU 301 illustrated in FIG. 2 and stores various data (or information) in the storage unit 3000 or reads various data (or information) from the storage unit 3000.

Functional Configuration of Reservation Management Server:

As illustrated in FIG. 5, the reservation management server 4 includes a transmission/reception unit 41, a determination unit 45, an authentication unit 46, a reservation information management unit 47, and a storing/reading unit 49. These units are functions that are implemented by or that are caused to function by operating any of the hardware elements illustrated in FIG. 3 in cooperation with the instructions of the CPU 401 according to the program dedicated to the reservation management server 4 expanded to the RAM 403 from at least one of the ROM 402 and the HD 404.

The reservation management server 4 further includes a storage unit 4000 implemented by the ROM 402 or the HD 404 illustrated in FIG. 3.

Reservation Information Management Table:

FIG. 6 is a conceptual diagram illustrating an example of a reservation information management table according to the present embodiment. The storage unit 4000 includes a reservation information management database (DB) 4001 that stores the reservation information management table as illustrated in FIG. 6. In the reservation information management table, a resource identification (ID) indicating resource identification information is used as a tab. In each tab, there are one or more records each being corresponding to a reservation ID and including items of reservation-making user account, start date and time, end date and time, and expected participant account(s), which are associated with each other. The resource ID to be tabbed is, for example, a001@meeting.com (meeting room A).

The reservation ID is identification information for identifying a single record of the reservation information. ID is an abbreviation for "identification (identifier)" and indicates an identification (identifier) or identification information. ID is one or any combination of a name, a code, a character string, and a numeral value, and used for uniquely distinguishing a specific target from a plurality of targets. The same applies to other IDs than the reservation ID.

The reservation-making user ID indicates an account of the reservation-making user who reserved the resource, and is, for example, an e-mail address indicated by a@ricoh.ex.com. The start date and time is a start date and time when the reservation starts (date and time when the reservation content starts), and the end date and time is an end date and time when the reservation ends (date and time when the reservation content ends). The expected participant ID indicates an account of a person, group, or the like who is expected to participate in an event executed with the resource reserved by the reservation-making user. The expected participant ID is, for example, an e-mail address indicated by b@ricoh.ex.com.

In the present embodiment, the reservation information management table (reservation information management DB 4001) functions as an example of a reservation information management storage device.

Functional Units of Reservation. Management Server:

A detailed description is given below of each functional configuration of the reservation management server 4. The transmission/reception unit 41 of the reservation management server 4 illustrated in FIG. 5 is mainly implemented by processing of the CPU 401 illustrated in FIG. 3, the external device connection I/F 407 and the network I/F 409 illustrated in FIG. 3. The transmission/reception unit 41 transmits or receives various data or various information to or from the resource management server 5 via the communication network 110 being outside of the firewall 105. The transmission/reception unit 41 receives, from the operation display terminal 2, a login authentication request or settings for a reservation for using a free address.

The determination unit 45 is mainly implemented by processing of the CPU 401 illustrating in FIG. 3 and makes various determinations on the reservation management server 4.

The authentication unit 46 mainly implemented by processing of the CPU 401 illustrated in FIG. 3 and authenticates a user based on the authentication information (for example, the user ID and the password) stored in the authentication information DB. An integrated circuit (IC) card or biometric authentication information may be used for the authentication.

The reservation information management unit 47 is mainly implemented by processing of the CPU 401 illustrated in FIG. 3 and manages the reservation information registered by the user. The reservation information management unit 47 reads various reservation information from the reservation information management DB 4001 and the resource reservation management DB 4003 described above and transmits the various reservation information to the resource management server 5 via the transmission/reception unit 41.

The storing/reading unit 49 is mainly implemented by processing of the CPU 401 illustrated in FIG. 3 and stores various data (or information) in the storage unit 4000 or reads various data (or information) from the storage unit 4000.

Functional Configuration of Resource Management Server:

As illustrated in FIG. 5, the resource management server 5 includes a transmission/reception unit 51, a received operation acquisition unit 52, a calculation unit 53, a determination unit 55, a setting generation unit 56, a communication unit 58, and a storing/reading unit 59. These units are functions that are implemented by or that are caused to function by operating any of the hardware elements illustrated in FIG. 3 in cooperation with the instructions of the CPU 501 according to the program dedicated to the resource management server 5 expanded to the RAM 503 from at least one of the ROM 502 and the HD 504. The resource management server 5 further includes a storage unit 5000 implemented by the ROM 502 or the HD 504 illustrated in FIG. 3.

Wireless LAN Access Point Management Table:

FIG. 7A is a conceptual diagram illustrating an example of a wireless LAN access point management table according to the present embodiment. The storage unit 5000 includes a wireless. LAN access point management DB 5001 that stores the wireless LAN access point management table as illustrated in FIG. 6A. The wireless LAN access point management table stores an API key associated with a Uniform Resource Identifier (URI) to be managed.

The URI is information indicating a location of the wireless LAN access point 6, and is represented by, for example, http://xxx.xxx.xxx.xxx.

An API Key is a character string set with respect to the wireless LAN access point 6 as a password for calling the API of the wireless LAN access point 6. In the present embodiment, the wireless LAN access point management table (wireless LAN access point management DB 5001) functions as an example of a communication relay device management storage device.

Resource Status Management Table:

FIG. 7B is a conceptual diagram illustrating an example of a resource status management table according to the present embodiment. The storage unit 5000 includes a resource status management DB 5002 that stores the resource status management table as illustrated in FIG. 7B. The resource status management table stores one or more records each corresponding to a data item of reservation ID and each including data items of reservation-making user account, event name, resource ID, start date and time, end date and time, expected participant account, and status (resource usage status), which are associated and stored and managed for each reservation ID. The reservation ID is identification information for identifying a single record of the reservation information.

The reservation-making user account is an account of an expected participant who made a reservation for the resource. The event name is a name of the event arbitrarily given by an expected participant. The resource ID is identification information that identifies a resource such as a meeting room in the company network. The start date and time is a date and time at which the usage of the reserved resource starts (date and time at which the event starts), and the end date and time is a date and time at which the usage of the reserved resource ends (date and time at which the event ends). That is, the start date and time is a beginning time point of a usage period of time set for the reserved resource and the end date and time is an end time point of the usage period of time set for the reserved resource. The expected participant account is an account of an expected participant is to attend the meeting.

The status represents a current status of the target resource. In a case that the resource is a space such as the meeting room, "in use" and "waiting for entering room" are used as usage statues, for example. The usage status of the resource may be associated with the reservation status. For example, each status related to the resource reservation, such as "notified", "reservation confirmed", "waiting for check-in", "checked-in", "checked-out", or "cancelled (cancellation)" may be registered. The usage status may be changed according to a current time with respect to the start date and time and the end date and time, or a predetermined user operation (check-in operation, etc.) performed with the operation display terminal 2 by the user. In addition to the space such as the meeting room, examples of the resources include various types of electronic devices, places such as rental offices and rental studios, rental cycles, rental cars (sharing cars), accommodation facilities such as hotels, facilities such as entertainment venues, and rental spaces such as rental lockers. As the usage status for the resource, any status suitable for a type of the resource may be used. Each of the accounts in the table illustrated in FIG. 6 is issued by the reservation management server 4.

In the present embodiment, the resource status management table (resource status management DB 5002) functions as an example of a resource status management storage device.

Event Identification Information Table:

FIG. 7C is a conceptual diagram illustrating an example of an event identification information management table according to the present embodiment. The storage unit 5000 includes an event identification information DB 5003 that stores the event identification information table as illustrated in FIG. 7C. The event identification information table stores one or more records each corresponding to a data item of reservation ID and each including data items of resource ID and event identification information, which are associated with each other.

The event identification information is information for check-in to the resource, such as a meeting room where the corresponding event is to be held. As the event identification information, texts, which are uniquely given, a series of number, which is multiple digits, or a combination of such texts and such numbers may be used. The Check-in is defined to start using the corresponding resource. In the present embodiment, the event identification information table (event identification information DB 5003) functions as an example of an event identification information management storage device.

Guest Network Management Table:

FIG. 8A is a conceptual diagram illustrating an example of a guest network management table according to the present embodiment. The storage unit 5000 includes a guest network management DB 5004 that stores the guest network management table as illustrated in FIG. 8A. The guest network management table stores one or more records each corresponding to a data item of SSID and each including data items of password, character type of password, usage status, available time (minutes), and usage end date and time, which are associated with each other.

The SSID is a character string input as an SSID of the wireless LAN access point 6. The password is generated in processing of adding a corresponding SSID, which may be referred to as a SSID addition process, hereinafter. A description of the processing is given later. The character type of password is a type of characters to be used for a password. The usage status is a status related to usage of a guest network. Specifically, the usage status indicates "VACANT" in the initial status and turns to "IN USE" when the SSID addition process, which is described later in detail, is successfully performed. Then, when processing of deleting the SSID, which may be referred to as a SSID deletion process, hereinafter, is successfully performed, the usage status turns to "VACANT".

The available time (minutes) is a time set in advance as a period of time during which the guest network is available. The usage end date and time is a date and time when a corresponding usage period of time is to be ended and is calculated based on the corresponding available time. The usage end date and time is set in the SSID addition process, which is described later in detail.

In the present embodiment, the guest network management table (guest network management DB 5004) functions as an example of a guest network management storage device.

Event Management Table:

FIG. 8B is a conceptual diagram illustrating an example of an event management table according to the present embodiment. The storage unit 5000 includes an event management DB 5005 that stores the event management table illustrated in FIG. 8B. The event management table stores one or more records each corresponding to a data item of reservation-making user ID and each including data items of display name, resource ID, event name, start date and time, and end date and time, which are associated with each other. The reservation-making user ID is an account of a user who has made a reservation for a resource or event and is one of the expected participants.

The display name is a name or a nickname to be displayed to represent a participant who participates in the event. The resource ID, the event name, the start date and time, and the end date and time are the same as those described above in the resource status management table, and a detailed description thereof is omitted below, accordingly. In the present embodiment, the event management table (event management DB 5005) functions as an example of an event management storage device.

Functional Units of Resource Management Server:

A detailed description is given below of each functional configuration of the resource management server 5. The transmission/reception unit 51 of the resource management server 5 illustrated in FIG. 5 is mainly implemented by processing of the CPU 501 illustrated in FIG. 3, the external device connection I/F 507 and the network I/F 509 illustrated in FIG. 3. The transmission/reception unit 51 transmits or receives various data or various information to or from the reservation management server 4 or the wireless LAN access point 6 via the communication network 110 being outside of the firewall 105.

The received operation acquisition unit 52 is mainly implemented by processing of the CPU 501 illustrated in FIG. 3. The received operation acquisition unit 52 receives one or more user operations for various settings in relation to the wireless LAN access point 6, one or more user operations for various settings of a guest network, one or more user operations, which are performed by a guest, for SSID addition instruction instructing the SSID addition process, and one or more user operations, which are performed by a guest or the network administrator, for SSID deletion instruction instructing the SSID deletion process, for example. The received operation acquisition unit 52 further acquires, for example, an elapsed time that is a period of time having been elapsed since the set guest network, the guest network according to the present embodiment, is created.

The calculation unit 53 is mainly implemented by processing of the CPU 501 illustrated in FIG. 3. The calculation unit 53 calculates the available time for the reserved resource in the guest network.

The determination unit 55 is mainly implemented by processing of the CPU 501 illustrated in FIG. 3. The determination unit 55 performs various determinations, controls, and processes in the resource management server 5 by executing the guest network creation application. The determination unit 55 further determines whether the elapsed time, which is a period of time having been elapsed since the wireless LAN access point 6 adds the SSID, exceeds the available time set for the wireless LAN. Data representing the available time is stored in the storage unit 5000, as will be described later.

The setting generation unit 56 is mainly implemented by processing of the CPU 501 illustrated in FIG. 3. The setting generation unit 56 sets and updates the usage status of the reserved resource. The setting generation unit 56 further generates a password for connecting to the network set for each SSID as a random character string. That is, in the present embodiment, the setting generation unit 56 functions as an example of a generator.

The communication unit 58 is mainly implemented by processing of the CPU 501 and the network I/F 509 illustrated in FIG. 3. The communication unit 58 transmits or receives various data or various information to or from the reservation management server 4 or the wireless LAN access point 6 via the communication network 110 being outside of the firewall 105. The communication unit 58 further transmits, to the wireless LAN access point 6, various signals for controlling the wireless LAN access point 6 and receives response signals. The communication unit 58 further transmits, to the wireless LAN access point 6, an addition request signal representing a request for adding an SSID. The communication unit 58 further transmits, to the wireless LAN access point 6, a deletion request signal representing a request for an SSID deletion the SSID.

The storing/reading unit 59 is mainly implemented by processing of the CPU 501 illustrated in FIG. 3 and stores various data (or information) in the storage unit 5000 or reads various data (or information) from the storage unit 5000.

Functional Configuration of Wireless LAN Access Point:

As illustrated in FIG. 5, the wireless LAN access point 6 includes a communication unit 61 and a processing unit 66. These units are functions that are implemented by or that are caused to function by operating any of the hardware elements illustrated in FIG. 5 in cooperation with the instructions of the CPU 601 according to the program dedicated to the wireless LAN access point 6 expanded to the RAM 603 from at least one of the ROM 602 and the EEPROM 604.

Functional Units of Wireless LAN Access Point:

A detailed description is given below of each functional configuration of the wireless LAN access point 6. The communication unit 61 of the wireless LAN access point 6 illustrated in FIG. 5 is mainly implemented by processing of the CPU 601, the external device connection I/F 607, and the network I/F 609, which are illustrated in FIG. 4. The communication unit 61 transmits or receives various data or various information to or from the resource management server 5 or the communication terminal 3 via the communication network 100 or the communication network 110.

As described above, the wireless LAN access point 6 is capable of setting one or more SSIDs, each of which is an identifier for identifying the own device. The processing unit 66 has a function of setting a guest network for each SSID.

Processes or Operation of Embodiment:

A description is now given of processes or operation performed by the resource management system 1 according to the present embodiment, with reference to FIG. 9 to FIG. 18.

Figure 9:
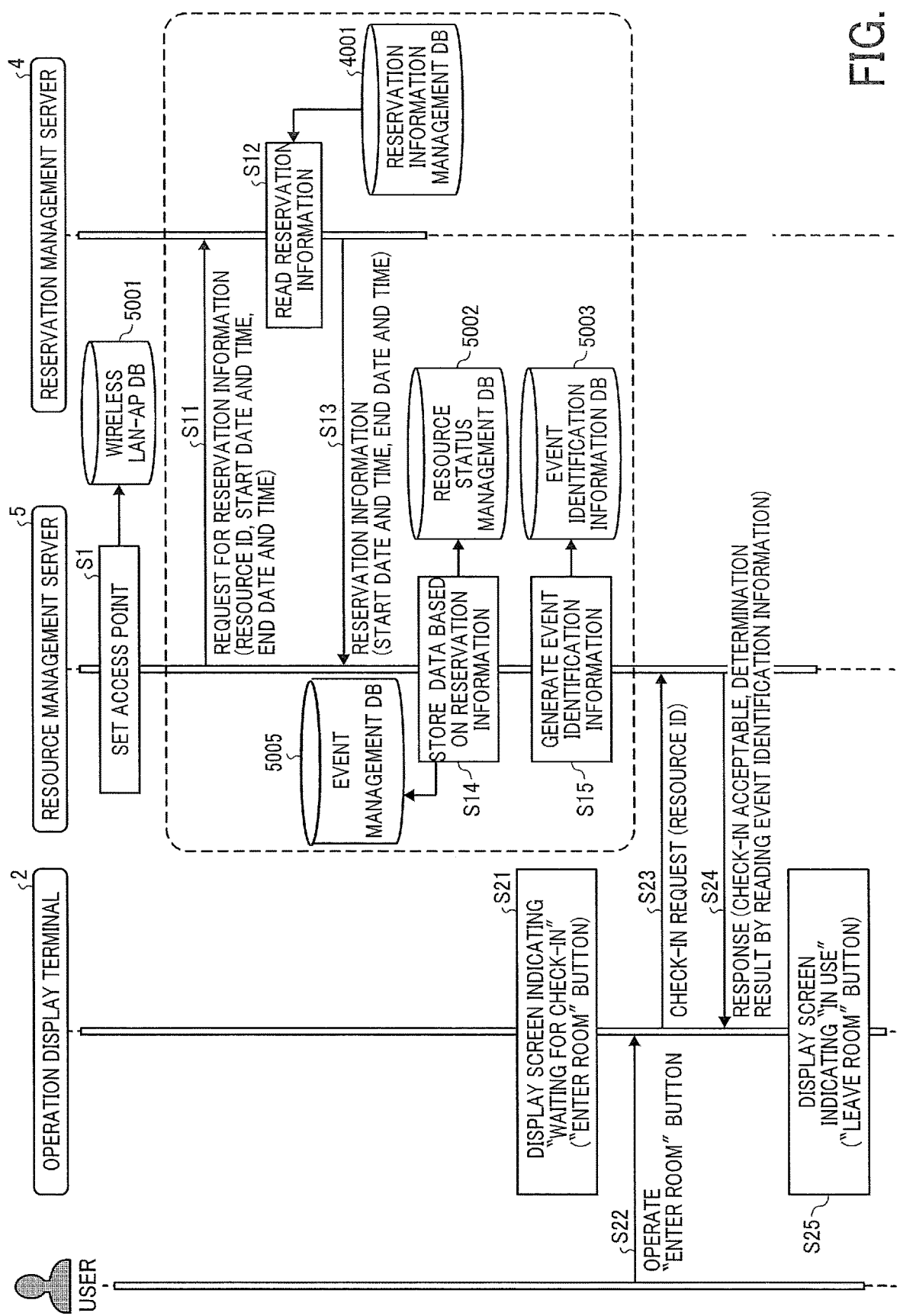
FIG. 9 is a sequence diagram illustrating an example of check-in process according to one or more embodiments of the present disclosure.
Figure 10:
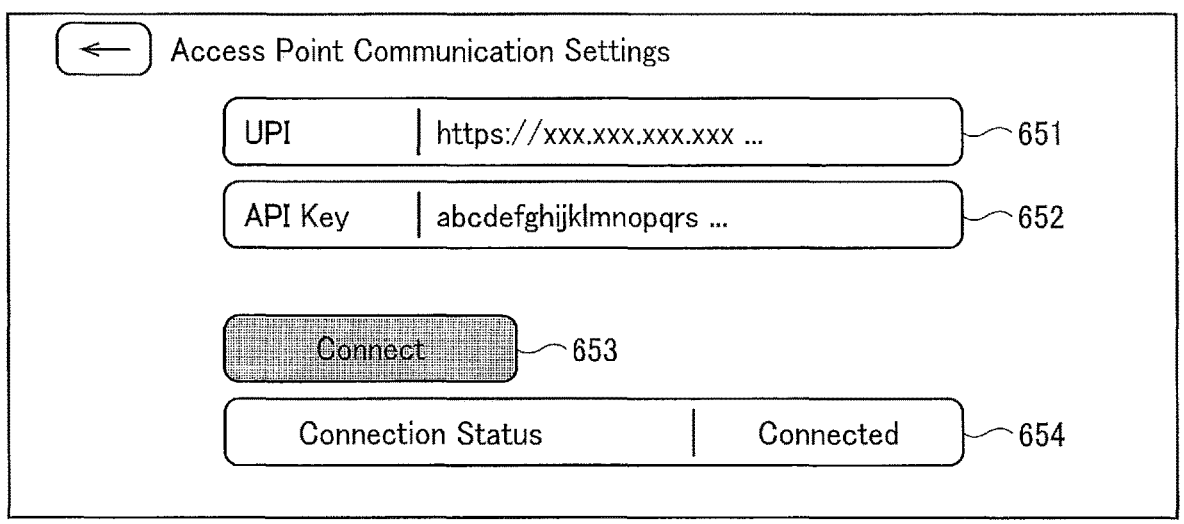
FIG. 10 is an illustration of an example of access point setting screen according to one or more embodiments.

Access Point Setting Process:

FIG. 9 is a sequence diagram illustrating an example of check-in process according to the present embodiment. First, a process of setting for a communication in relation to the wireless LAN access point 6, performed by the resource management server 5, according to an operation of the network administrator or the like is described. When receiving a display request indicating a request to display an access point setting screen, the received operation acquisition unit 52 of the resource management server 5 displays the access point setting screen as illustrated in FIG. 10 (step S1). In this case, the communication settings for the wireless LAN access point 6 may be executed by a user operation performed by the network administrator, for example. In the present embodiment, the check-in process is a process including a process for entering the resource such as the meeting room, for example.

FIG. 10 is an illustration of an example of access point setting screen according to the present embodiment. As illustrated in FIG. 10, the access point setting screen includes a URI input field 651 and an API Key input field 652 that are set according to a process for calling a wireless LAN access point by executing the guest network creation application. The API Key is a character string set with respect to the wireless LAN access point 6 as a password for calling the API of the wireless LAN access point 6. Then, when the received operation acquisition unit 52 detects that an operation of pressing a connection establishment ("Connect") button 653 is accepted, the communication unit 58 transmits a signal for confirming the connection of the wireless LAN access point 6 and waits for a response signal. Then, when the communication unit 58 receives the response signal, the determination unit 55 determines whether the connection is successfully established or not based on the received response signal. Through the process described above, the resource management server 5 displays a determination result determined by the determination unit 55 in the connection status display area 654. The detection of the operation of pressing the connection establishment button 653 is not limited to the user operation performed by the network administrator or the like, and a setting related to the detection may be made according to the process for calling the wireless LAN access point as described above.

As described above, the resource management server 5 makes settings for the communication for the wireless LAN access point 6 automatically by the guest network creation application or according to the user operation performed using the keyboard 510 or the pointing device 511 by the network administrator, for example. The resource management server 5 may set for the communication by accepting related information transmitted from a management terminal. The input information is stored and managed in the wireless LAN access point management DB 5001 as the wireless LAN access point management table.

For simplification of the system, the resource management system 1 may have a configuration that does not require authentication for calling the API of the wireless LAN access point 6. In addition, the authentication method for calling the API of the wireless LAN access point 6 may be an authentication method other than the one that uses the API Key. An example of such an authentication method is using a combination of two or more types of authentication.

Initial Setting Process:

Referring back to FIG. 9, a process for performing initial settings (initial setting process) for the operation display terminal 2 is described below. It is assumed that a dedicated guest network creation application is installed on at least one of the operation display terminal 2 and the resource management server 5.

The transmission/reception unit 51 of the resource management server 5 transmits a resource information acquisition request (request for reservation information) that includes a resource ID and a customer ID to the reservation management server 4 at predetermined time intervals (step S11). Thereby, the transmission/reception unit 41 of the reservation management server 4 receives the resource information acquisition request, which includes the resource ID and the customer ID, transmitted by the resource management server 5. The reservation information acquisition request is defined as a request for reservation information corresponding to a reservation-making user who has an account indicated by a domain that is specified in the request. Thereby, the resource management server 5 acquires the reservation information corresponding to a certain period of time. The predetermined time intervals at which the reservation information acquisition request is transmitted may be relatively short, e.g., every few minutes, every 30 minutes, or every hour. In addition, every time when new reservation information is registered or any reservation information is changed, the newly registered or changed reservation information may be automatically transmitted from the reservation management server 4. The predetermined time intervals may be set by a designer or a user. In the present embodiment, the transmission/reception unit 51 functions as an example of a transmitter.

Subsequently, the storing/reading unit 49 of the reservation management server 4 searches the reservation information management table (see FIG. 6) using the resource ID received by the transmission/reception unit 41 as a search key to read the reservation information associated with the corresponding meeting room. (step S12). At the same time, the storing/reading unit 49 searches the data table stored and managed in the reservation management server 4 using the customer ID as a search key to read the corresponding information.

Subsequently, the transmission/reception unit 41 transmits the reservation information associated with the resource to the resource management server 5 as a response of the resource information acquisition (step S13). Thereby, the transmission/reception unit 51 of the resource management server 5 receives the reservation information associated with the resource transmitted by the transmission/reception unit 41 of the reservation management server 4. The reservation information associated with the resource includes, for example, a reservation-making user account, a start date and time and an end date and time of an event held in a meeting room as the resource, expected participant accounts, for example. In the present embodiment, the transmission/reception unit 51 functions as an example of a receiver.

Subsequently, the storing/reading unit 59 of the resource management server 5 registers, based on the reservation information received by the transmission/reception unit 51, to the resource status management table included in the resource status management DB 5002 and the event management table included in the event management DB 5005 (step S14). As a result, the acquired information related to each meeting room is registered and managed in the resource status management DB 5002 and the event management DB 5005. Since the information on the meeting room does not change frequently, for acquisition of the information may be at a low frequency such as once per day. In addition, the received operation acquisition unit 52 may acquire the reservation information from the reservation management server 4 periodically or when the reservation information is updated.

Subsequently, the setting generation unit 56 generates event identification information corresponding to the resource ID and registers the event identification information in the event identification information table (see FIG. 7C) via the storing/reading unit 59 (step S15).

In the resource management system 1 according to the present embodiment, when the processing of steps S11 or S13 described above is performed, another device may be between the resource management server 5 (resource management device) and the reservation management server 4 (reservation management device). That is, the resource management system 1 may have a configuration in which the information transmitted or received between the resource management server 5 and the reservation management server 4 is transmitted or received via another device. The above-described configuration and processing method may also be applied in the subsequent processing steps.

Figure 11:
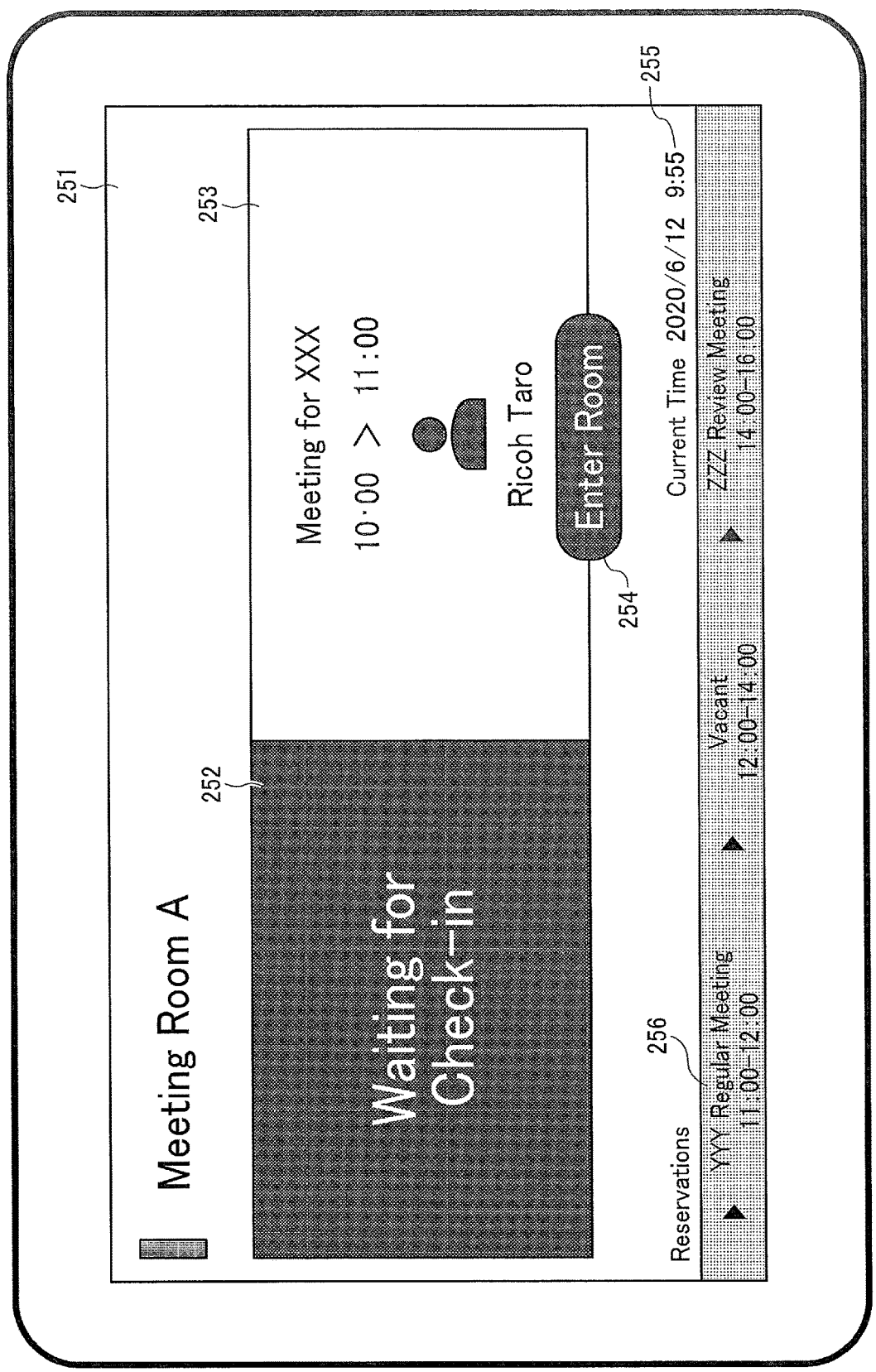
FIG. 11 is an illustration of an example of display screen that indicates waiting for entering a resource and is displayed on an operation display terminal according to one or more embodiments.

Check-In Process:

Subsequently, the check-in process performed according to an operation of the user is described with reference to FIG. 9. First, the display control unit 24 of the operation display terminal 2 causes the display 218 to display a standby screen 251 as illustrated in FIG. 11, which is described later in detail. An operation button 254 of the standby screen 251 is displayed as "Enter Room" (step S21). By periodically communicating with the resource management server 5, the operation display terminal 2 acquires the reservation information associated with the resource ID corresponding to the meeting room in which the operation display terminal 2 is provided. For example, the operation display terminal 2 acquires the reservation information including a reservation-making user ID, a start date and time, and an end date and time from the resource management server 5. The operation display terminal 2 displays a screen including the reservation-making user ID, the start date and time, and the end date and time based on the acquired reservation information.

Subsequently, the reception unit 22 receives any one of user operations performed with respect to "Enter Room" displayed as the operation button 254 (step S22). The user operation, which may be simply referred to as an operation, hereinafter, include pressing, touching, tapping, etc. on the operation button 254. In addition to the operation performed to the operation button 254 described above, as a check-in method performed by a guest user, transmitting information including a two-dimensional code or resource identification information by using short-range wireless communications such as BLUETOOTH LOW ENERGY (registered trademark) may be used. The guest user is also an example of a user.

By operating the operation button 254, "Enter Room", the guest user is allowed to input the event identification information. In response to the above-described processing (operation), the transmission/reception unit 21 transmits the event identification information and the resource ID indicating the identification information of the resource (meeting room A) to the resource management server 5 as a check-in request including check-in information (step S23). The check-in information indicates that an operation for entering a room (process for transmitting the check-in request) is performed with respect to the operation display terminal 2. Thereby, the transmission/reception unit 51 of the resource management server 5 receives the resource ID transmitted from the operation display terminal 2. The check-in request includes the resource ID of the meeting room A. The resource ID may be set in the operation display terminal 2 in advance, or may be input by the user at the time of check-in. The input of the event identification information may be omitted, namely the event identification information may not be input. In the description of the embodiment, the process for transmitting the check-in request may be referred to as the operation for entering a room.

The resource management server 5, which has received the check-in request, transmits a response indicating the check-in is acceptable, from the transmission/reception unit 51 to the operation display terminal 2 (step S24). Thereby, the transmission/reception unit 21 of the operation display terminal 2 receives the response, which indicates the check-in is acceptable, transmitted from the resource management server 5.

Figure 12:
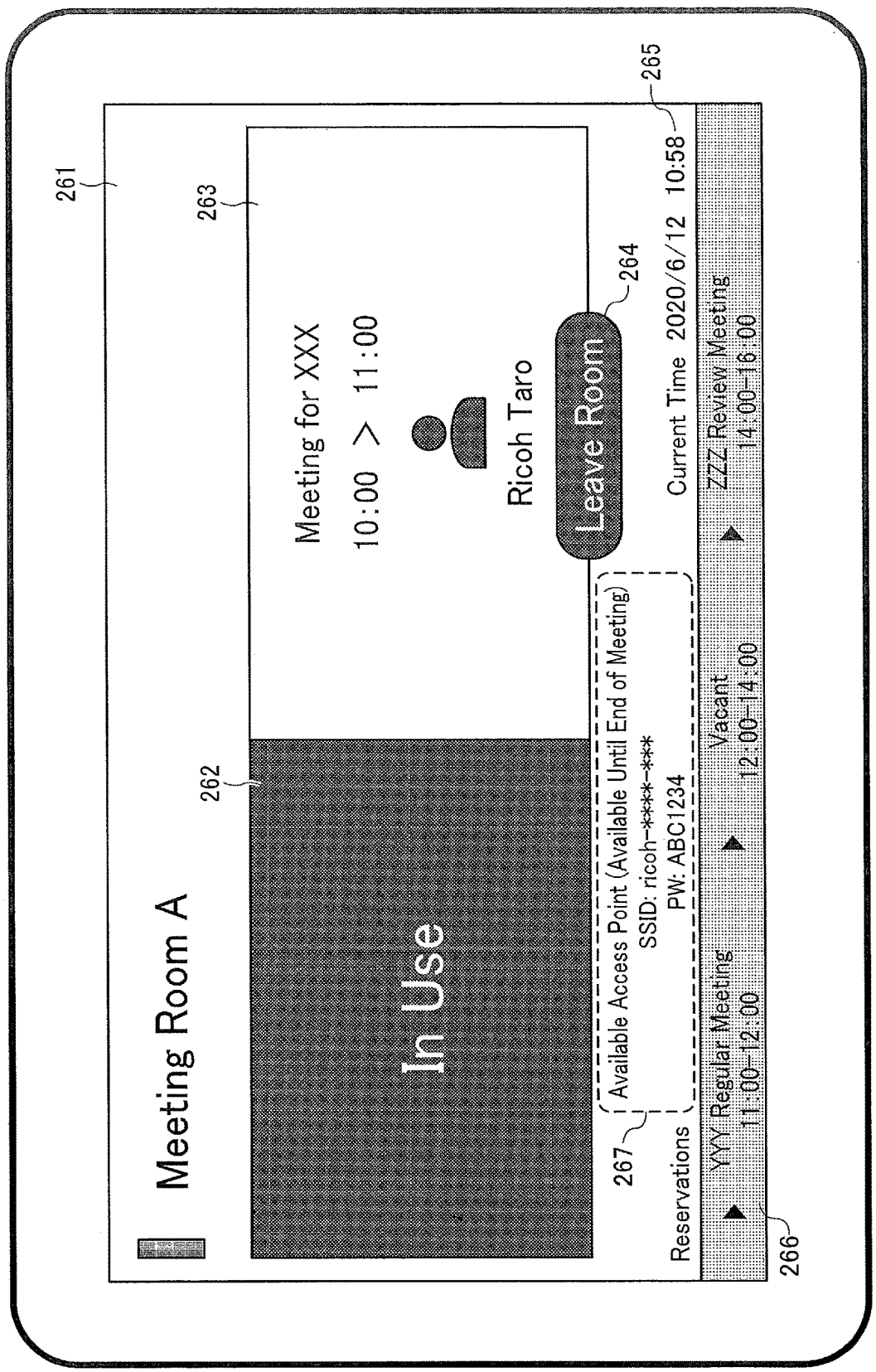
FIG. 12 is an illustration of an example of display screen displayed on the operation display terminal during the resource is being used, according to one or more embodiments.

After that, the display control unit 24 causes the display 218 to display a standby screen 261 as illustrated in FIG. 12 (step S25).

In the processing of steps S21 to S25 described above, for example, 10 minutes before a start date and time of the next reservation event, the status of the resource status management table (see FIG. 7B) is changed to "WAITING FOR CHECK-IN", or "CHECK-IN AVAILABLE", for example. The display control unit 24 displays a current status display area 252 as "waiting for check-in" and accepts check-in when the operation for check-in is performed. In other words, this allows the reservation-making user to check in. Further, if the operation display terminal 2 does not transmit the check-in request by a preset time, the determination unit 55 of the resource management server 5 determines that no check-in is detected, and the reservation content (reserved event) currently displayed on the standby screen 251 is automatically canceled. Accordingly, the calculation unit 53 counts down the time for the automatic cancellation, and the current status display area 252 indicates that the cancellation process has been executed is displayed. A time set for the automatic cancellation is, for example, 15 minutes after the start date and time.

In the resource management system 1 according to the present embodiment, when the processing of steps S23 or S24 described above is performed, another device may be between the operation display terminal 2 (operation display terminal) and the resource management server 5 (resource management device). That is, the resource management system 1 may have a configuration in which the information transmitted or received between the operation display terminal 2 and the resource management server 5 is transmitted or received via another device.

Screen Example at Check-In

A description is given below of an example of screen at check-in. FIG. 11 is an illustration of an example of display screen that indicates waiting for entering a resource and is displayed on the operation display terminal 2 according to the present embodiment. In FIG. 11, an example of standby screen displayed on the display 218 of the operation display terminal 2 is illustrated. The standby screen indicates that the meeting room A is vacant at a time of 9:55 on Jun. 12, 2020 and is displayed when the start date and time of the next event (for example, Meeting for XXX) is within a predetermined time. In the example of FIG. 11, the screen is displayed five minutes before the start of the "Meeting for XXX". The standby screen 251 as illustrated in FIG. 11 includes the current status display area 252, the event details display area 253, the operation button 254, a current time display area 255, and a following-reservations display area 256.

In the current status display area 252, "Waiting for Check-In" is displayed. In addition, in the event details display area 253, "Meeting for XXX" indicating the event content, "10:00>11:00" indicating the start date and time and the end date and time of the event to be carried out, and "Ricoh Taro" indicating the reservation-making user (or the organizer) of the meeting are displayed.

As for the reservation-making user, the account included in the reservation information associated with the event may be used, or a name or a nickname of the reservation-making user may be transmitted from the resource management server 5. A photograph of the reservation-making user or an icon representing the reservation-making user may be additionally or alternatively displayed.

The operation button 254 is displayed as "Enter Room" and receives an operation performed by the user (including a guest user).

In the current time display area 255, "2020/06/12 9:55" indicating a current time is displayed. In FIG. 11, the current time is five minutes before the start of "Meeting for XXX".

In the following-reservations display area 256, for example, YYY Regular Meeting, ZZZ Review meeting, etc. are displayed. The standby screen 251 indicates a start time of YYY Regular Meeting is 11:00 that is the end time of "Meeting for XXX", which is displayed in the event details display area 253.

Screen Example after Check-In

A description is given below of an example of screen after check-in. FIG. 12 is an illustration of an example of display screen displayed on the operation display terminal during the resource is being used, according to the present embodiment.

The standby screen 261 as illustrated in FIG. 12 includes a current status display area 262, an event details display area 263, an operation button 264, a current time display area 265, a following-reservations display area 266, and an SSID display area 267.

In the current status display area 262, "In Use" is displayed. In addition, in the event details display area 263, "Meeting for XXX" indicating the event content, "10:00>11:00" indicating the start date and time and the end date and time of the event to be carried out, and "Ricoh Taro" indicating the reservation-making user (or the organizer) of the meeting are displayed.

As for the reservation-making user, the account included in the reservation information associated with the event may be used, or a name or a nickname of the reservation-making user may be transmitted from the resource management server 5. A photograph of the reservation-making user or an icon representing the reservation-making user may be additionally or alternatively displayed.

The operation button 264 is displayed as "Leave Room" and receives an operation performed by the user.

In the current time display area 265, "2020/06/12 10:58" indicating a current time is displayed. In FIG. 12, the current time is two minutes before the scheduled end time of "Meeting for XXX".

In the following-reservations display area 266, for example, YYY Regular Meeting, ZZZ Review meeting, etc. are displayed. The standby screen 261 indicates a start time of YYY Regular Meeting is 11:00 that is the end time of "Meeting for XXX", which is displayed in the event details display area 263.

The various information displayed on the operation display terminal 2 may be generated by the operation display terminal 2 based on the reservation information, in alternative to the resource management server 5. In this case, the resource management server 5 controls the standby screen of the operation display terminal 2 by executing the browser software.

Figure 13:
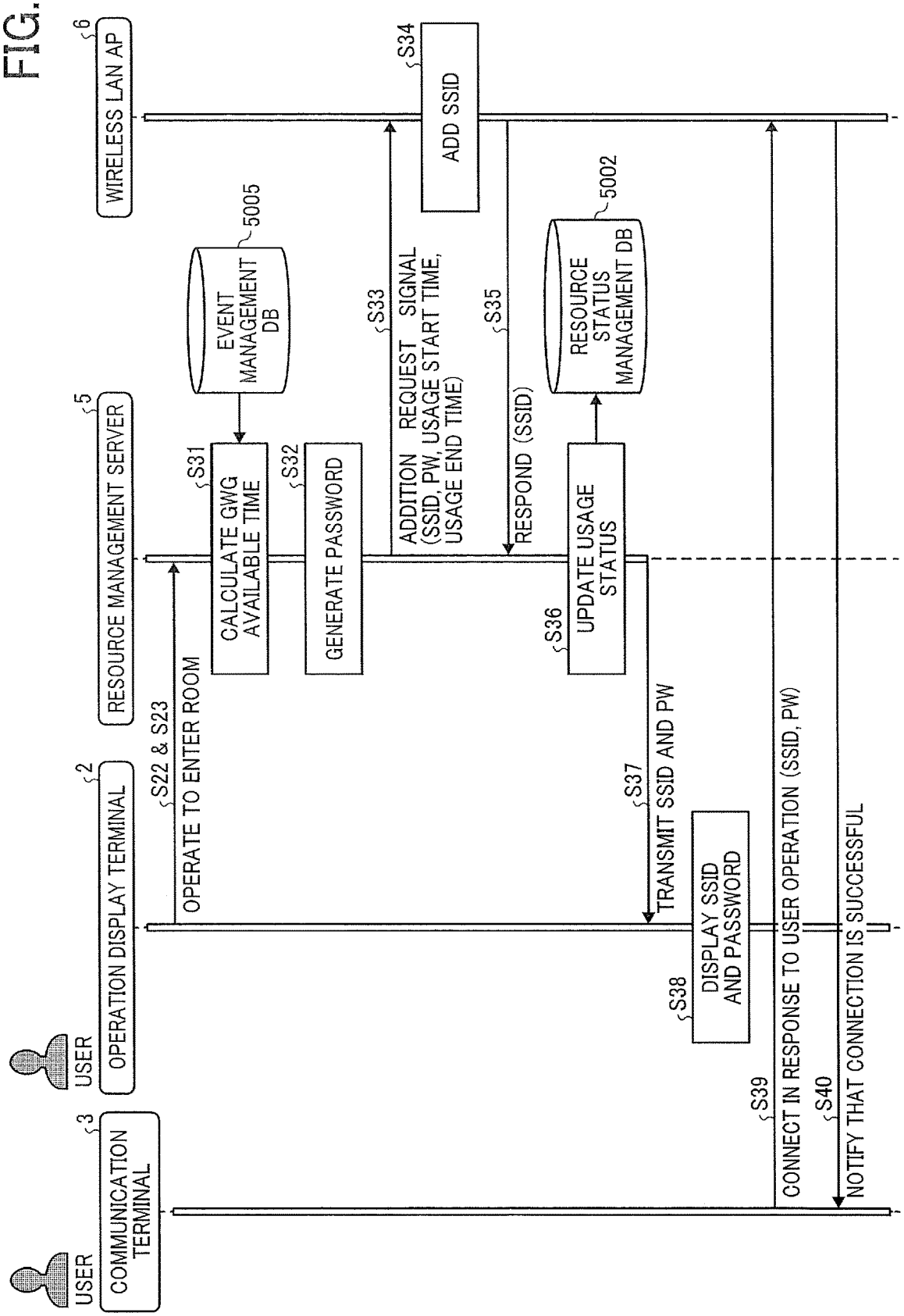
FIG. 13 is a sequence diagram illustrating an example of SSID and password creation and display process according to one or more embodiments of the present disclosure.

SSID Generation/Update Process:

Subsequently, a process of generating an SSID and a password and a display process are described with reference to FIG. 13. FIG. 13 is a sequence diagram illustrating an example of SSID and password creation and display process according to the present embodiment. As described above, in response to the processing of steps S22 and S23 being performed, the transmission/reception unit 51 of the resource management server 5 receives the inputs according to the operation for entering a room. The operation for entering a room also includes an operation of requesting to start the guest network creation application. The operation of requesting to start the guest network creation application is performed by the guest user.

Subsequently, the calculation unit 53 calculates the available time for the guest network (or the remaining available time) (step S31). The GWG described in the process of step S31 is an acronym for Guest Wi-Fi Generator. The available time (or remaining available time) for the guest network performed is calculated by the calculation unit 53 as follows. For example, the calculation unit 53 searches the event management table (see FIG. 8B) using the resource ID received in step S23 as a search key to read the end date and time in cooperation with the storing/reading unit 59. Then, the calculation unit 53 calculates the available time for the guest network based on the current time managed by the resource management server 5 and the read end date and time. However, this is not limiting on the disclosure, and the calculation unit 53 may calculate the available time for the guest network based on the end date and time included in the reservation information. For example, the calculation unit 53 may calculate the available time for the guest network by specifying the reservation ID based on the event identification information received in step S23 and reading the reservation end date and time based on the reservation ID. The calculation unit 53 may calculate the available time for the guest network by specifying the reservation ID based on the resource ID received in step S23 and the date and time when the operation for entering a room is performed and reading the end date and time of the reservation based on the specified reservation ID.

After the available time for the guest network is calculated, the setting generation unit 56 generates a password (PW) (step S32). Specifically, the setting generation unit 56 generates a character string as the password by selecting characters for the character string from the characters included in the password character type set in the guest network management table (see FIG. 8A), which is included in the guest network management DB. Then, the setting generation unit 56 stores the generated password in the guest network management table to update the data.

After the password is generated, the transmission/reception unit 51 transmits an addition request signal to the wireless LAN access point 6 (step S33). Thereby, the communication unit 61 of the wireless LAN access point 6 receives the addition request signal transmitted from the resource management server 5. The addition request signal includes the SSID, the password corresponding to the SSID, the usage start date and time, and the usage end date and time. The reason for transmitting the usage start date and time and the usage end date and time is that the scheduled event may not start on time, but may actually start behind or before the scheduled time, and information required to be transmitted is information on a date and time that is after the guest user performs the operation for entering a room. That is, a real time when the corresponding event associated with the resource reservation is actually started is transmitted to the wireless LAN access point 6. However, the addition request signal may not include the usage start date and time.

In the present embodiment, the operation display terminal 2 may be provided with a function of the setting generation unit 56, and the resource management server 5 may transmit a signal for requesting to set the password to the operation display terminal 2. In this case, after step S32 described above, the operation display terminal 2 generates a password and transmits the generated password to the resource management server 5. Then the resource management server 5 may transfers the password transmitted from the operation display terminal 2 to the wireless LAN access point 6.

The processing unit 66 of the wireless LAN access point 6, which has received the addition request signal performs the SSID addition process (step S34). In the SSID addition process, the SSID is added based on the information included in the addition request signal. As a result, the wireless LAN access point 6 is in a state in which the wireless LAN access point 6 permits the use of the wireless LAN in response to the connection request from the operation display terminal 2 that has the corresponding SSID and password that includes a combination of the added SSID and password.

After the process of adding the SSID succeeds, the wireless LAN access point 6 transmits a success signal to the resource management server 5 (step S35). Thereby, the transmission/reception unit 51 of the resource management server 5 receives the success signal transmitted from the wireless LAN access point 6. The success signal includes the added SSID. On the other hand, when the process of adding the SSID fails in the processing of step S35, the wireless LAN access point 6 transmits a failure signal to the resource management server 5. When the communication unit 58 of the resource management server 5 receives the failure signal, the transmission/reception unit 51 retransmits the addition request signal to the wireless LAN access point 6.

Subsequently, the setting generation unit 56 updates the usage status of the resource, which is a target resource to be used (step S36). Specifically, the setting generation unit 56 updates the resource status (usage status) corresponding to the resource in use (resource ID) in the resource status management table (see FIG. 7B), in cooperation with the storing/reading unit 59. The status (usage status) to be updated is updated to, for example, "IN USE". The setting generation unit 56 may further update the usage status in the guest network management table (see FIG. 8B). The status (usage status) to be updated is updated to, for example, "IN USE".

Following to the processing of step S36, the transmission/reception unit 51 of the resource management server 5 transmits the SSID and password for the guest network that is available by the guest user to the operation display terminal 2 (step S37). Thereby, the transmission/reception unit 21 of the operation display terminal 2 receives the SSID and password for the guest network transmitted from the resource management server 5.

Then, the display control unit 24 of the operation display terminal 2 displays, for example, the SSID and password (PW) as an available access point in the SSID display area 267 of the standby screen 261 as illustrated in FIG. 12 (step S38). At this time, a message indicating that the SSID and password is valid until the end of the meeting may also be displayed.

As described above, the resource management server 5 accepts that the operation for entering a room performed by the guest user and causes the wireless LAN access point 6 to execute the SSID addition process for making the guest network be available.

After that, the guest user who confirms the standby screen 261 inputs the SSID and password using the communication terminal 3 such as a notebook PC owned by the guest user for communicably connecting the communication terminal 3 to the wireless LAN access point 6. That is, the transmission/reception unit 31 of the communication terminal 3 transmits the SSID and password to the wireless LAN access point 6 (step S39). Thereby, the transmission/reception unit 51 of the wireless LAN access point 6 receives the SSID and password transmitted from the communication terminal 3.

The processing unit 66 of the wireless LAN access point 6 confirms the SSID and password transmitted from the communication terminal 3 and performs processing related to whether the establishment of the connection is acceptable or not. When the connection is acceptable (authentication is successful), the communication unit 61 transmits a connection success notification to the communication terminal 3 (step S40). Thereby, the transmission/reception unit 31 of the communication terminal 3 receives the connection success notification transmitted from the wireless LAN access point 6.

In the processing of steps S37 and S38 described above, the SSID and password may be directly transmitted to the communication terminal 3 such as a notebook PC owned by the guest user. This allows the guest user to skip a procedure of checking the content displayed on the operation display terminal 2. In addition, the SSID and password is notified to the guest user alone, resulting in further improving security in relation to the guest network.

In the resource management system 1 according to the present embodiment, when the processing of steps S33 to S35 described above is performed, another device may be between the resource management server 5 (resource management device) and the wireless LAN access point 6 (communication relay device). That is, the resource management system 1 may have a configuration in which the information transmitted or received between the resource management server 5 and the wireless LAN access point 6 is transmitted or received via another device.

Figure 14:
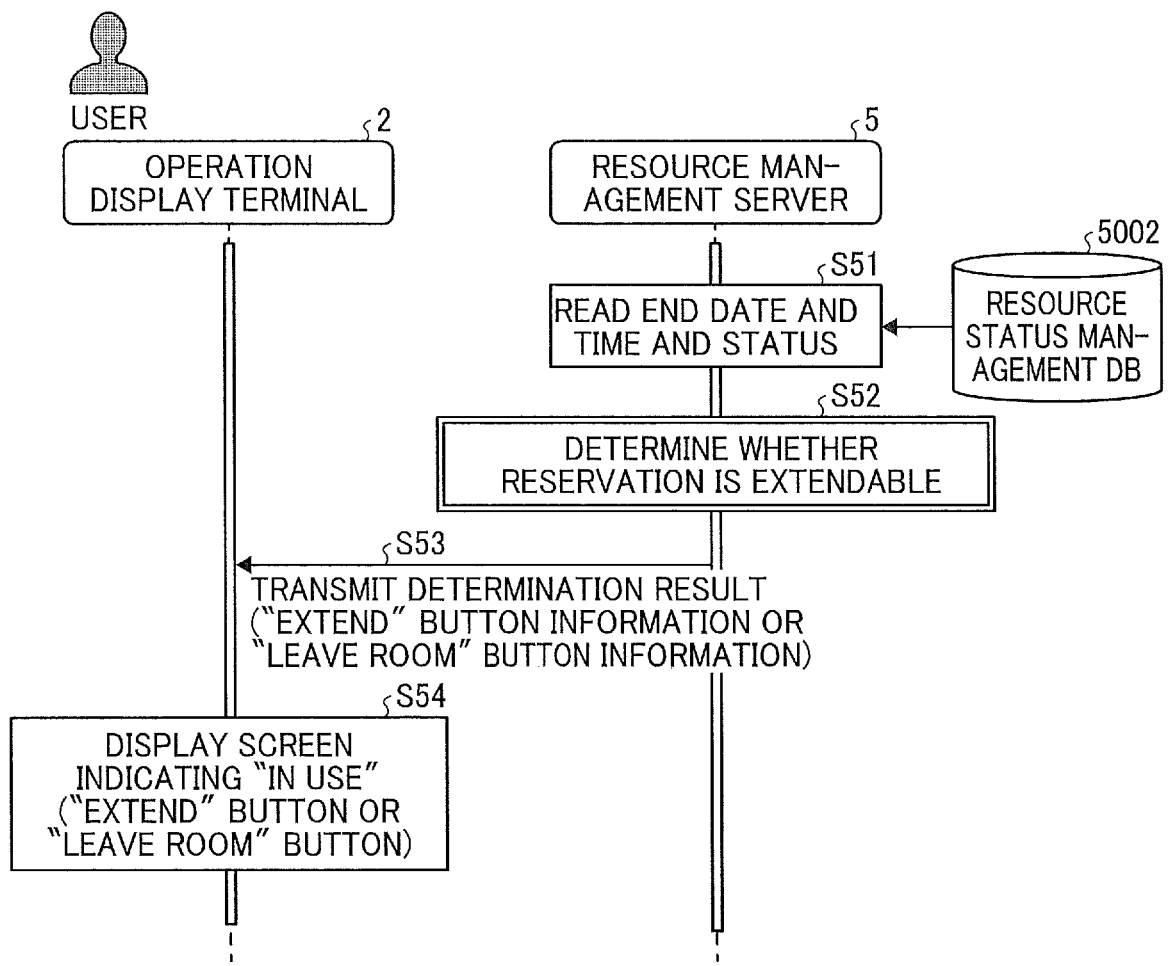
FIG. 14 is a sequence diagram illustrating an example of reservation extension possibility determination process according to one or more embodiments of the present disclosure.

Check-Out or Reservation Extension Process:

A description is given below of a check-out process or a reservation extension process. FIG. 14 is a sequence diagram illustrating an example of reservation extension possibility determination process according to the present embodiment.

First, the storing/reading unit 59 of the resource management server 5 searches the resource status management table (see FIG. 7B) using the resource ID related to the reservation currently executed as a search key to read the corresponding end date and time (information on end and time) and status (step S51). At this time, in alternative to the resource ID, the current time may be used as the search key to read the status associated with the resource ID of which the start date and time and the end date and time indicates the current time is between the start date and time and the end date and time.

Subsequently, the determination unit 55 cooperates with the calculation unit 53 to determine whether the current reservation is extendable or not (step S52). A detailed description of the process is given later with reference to FIG. 15.

Figure 15:
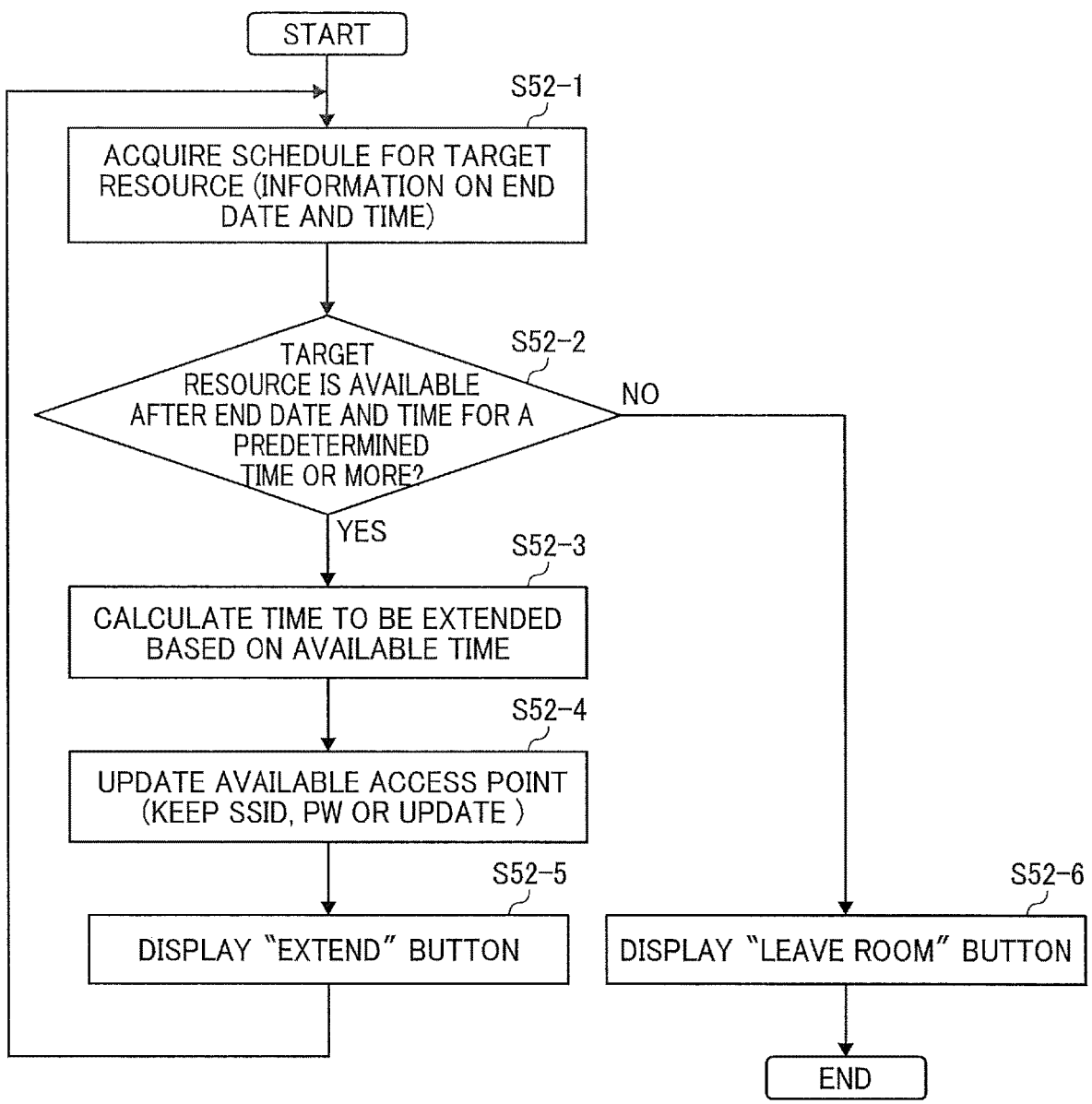
FIG. 15 is a flowchart illustrating an example of process of determining whether reservation is extendable or not, according to one or more embodiments of the present disclosure.

Process of Determining Whether Check-Out or Reservation Extension:

FIG. 15 is a flowchart illustrating an example of process of determining whether reservation is extendable or not, according to the present embodiment. As illustrated in FIG. 15, the received operation acquisition unit 52 of the resource management server 5 acquires the schedule (information on the end date and time) for the target resource to be reserved acquired in step S51 (step S52-1).

Subsequently, the determination unit 55 determines whether the target resource is available for a predetermined time or more after the end date and time, which is indicated by the information on the end date and time (step S52-2).

Figure 17:
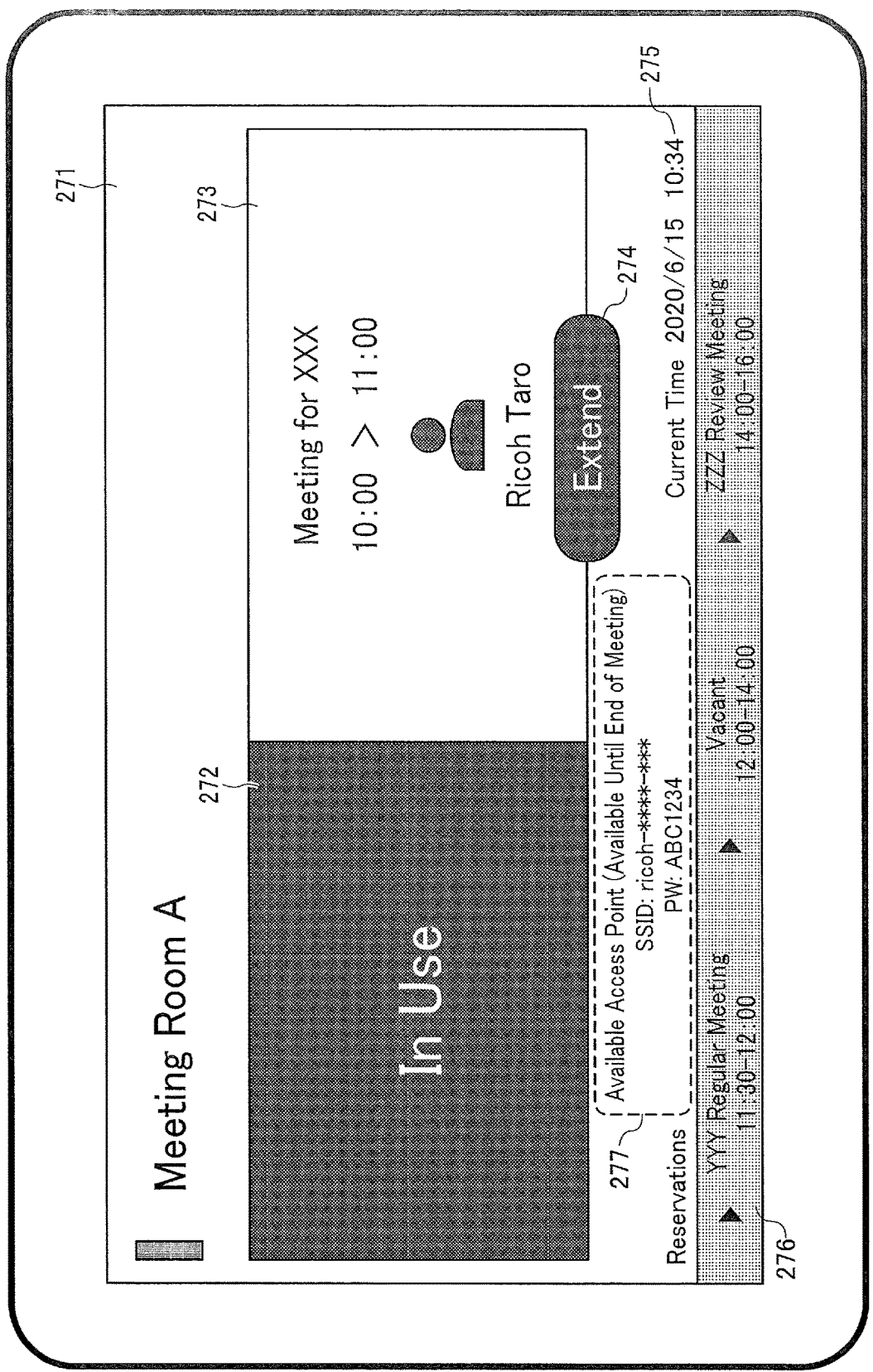
FIG. 17 is an illustration of an example of display screen displayed on the operation display terminal at a time when a reservation is extended, according to one or more embodiments of the present disclosure.

When the target resource is available for the predetermined time or more after the end date and time (step S52-2: YES), the calculation unit 53 calculates a period of time to be extended according to the available time (step S52-3). For example, as illustrated in FIG. 17, which is described later in detail, when the end date and time of the current event in the meeting room A is 11:00 and the reservation after the current event starts from 11:30, the calculation unit 53 may obtain 30 minutes, which is a time difference, as the available time. In general, 30 minutes is enough for making an additional review or decision in a meeting or the like. Accordingly, the determination unit 55 determines that an extendable time is 30 minutes, which is calculated by the calculation unit 53, and allows the calculation unit 53 to calculate the extension time. That is, the determination unit 55 may perform the processing in cooperation with the setting generation unit 56 so as to set a threshold value for determining whether the reservation is extendable according to the content of the reserved event, for example. In case that the extension time is further sufficient, the communication unit 58 transmits information for displaying an extendable time to the operation display terminal 2. After that, the operation display terminal 2 may display the extendable time on the standby screen 271 based on the information for displaying an extendable time and provide a User Interface (UI) for the guest user to select.

Subsequently, the setting generation unit 56 updates the available access points (step S52-4). Specifically, the setting generation unit 56 maintains, or keep, the current SSID and password. At this time, the setting generation unit 56 may update the usage end date and time in the guest network management table (see FIG. 8B). In view of security, the SSID and password may be updated again at a time of the extension start date and time and may be notified to the guest user. In this case, the setting generation unit 56 generates the SSID and password, stores the generated SSID and password in the guest network management table, and updates the usage end date and time according to the extension time. Further, the transmission/reception unit 51 transmits an addition request signal to the wireless LAN access point 6.

Subsequently, the communication unit 58 transmits information indicating the extension to the operation display terminal 2. The display content of the operation button 274 is changed to "Extend" as illustrated in FIG. 17, and the process returns to S52-1 (step S52-5).

On the other hand, when the target resource is not available for the predetermined time or more after the end date and time (step S52-2; NO), the communication unit 58 transmits normal end information to the operation display terminal 2, and the display content of the operation button 264 is changed to "Leave Room" as illustrated in FIG. 12, and the process ends (step S52-6). A case the-above described processing is performed is, for example, a case that the end date and time of the reserved event is 11:00, and the subsequent reservation starts from 11:00 or 11:05. In such a case, the determination unit 55 determines that the extension is not possible even the event is a meeting. In the present embodiment, the determination unit 55 functions as an example of a determiner.

Returning to FIG. 14, the transmission/reception unit 51 of the resource management server 5 transmits a result of determination, which determines whether the reservation is extendable, performed in step S52 to the operation display terminal 2 (step S53). Thereby, the transmission/reception unit 21 of the operation display terminal 2 receives the result of determining whether or not to extend the reservation transmitted from the resource management server 5. The result of determination, which determines whether the reservation is extendable, includes information for displaying the button representing "Extend" or information for displaying the button representing "Leave Room".

The display control unit 24 of the operation display terminal 2 that has received the determination result through the processing of step S53 displays the standby screen 261 as illustrated in FIG. 12 or the standby screen 271 as illustrated in FIG. 17 and waits for receiving a user operation performed by the guest user (step S54).

Figure 16:
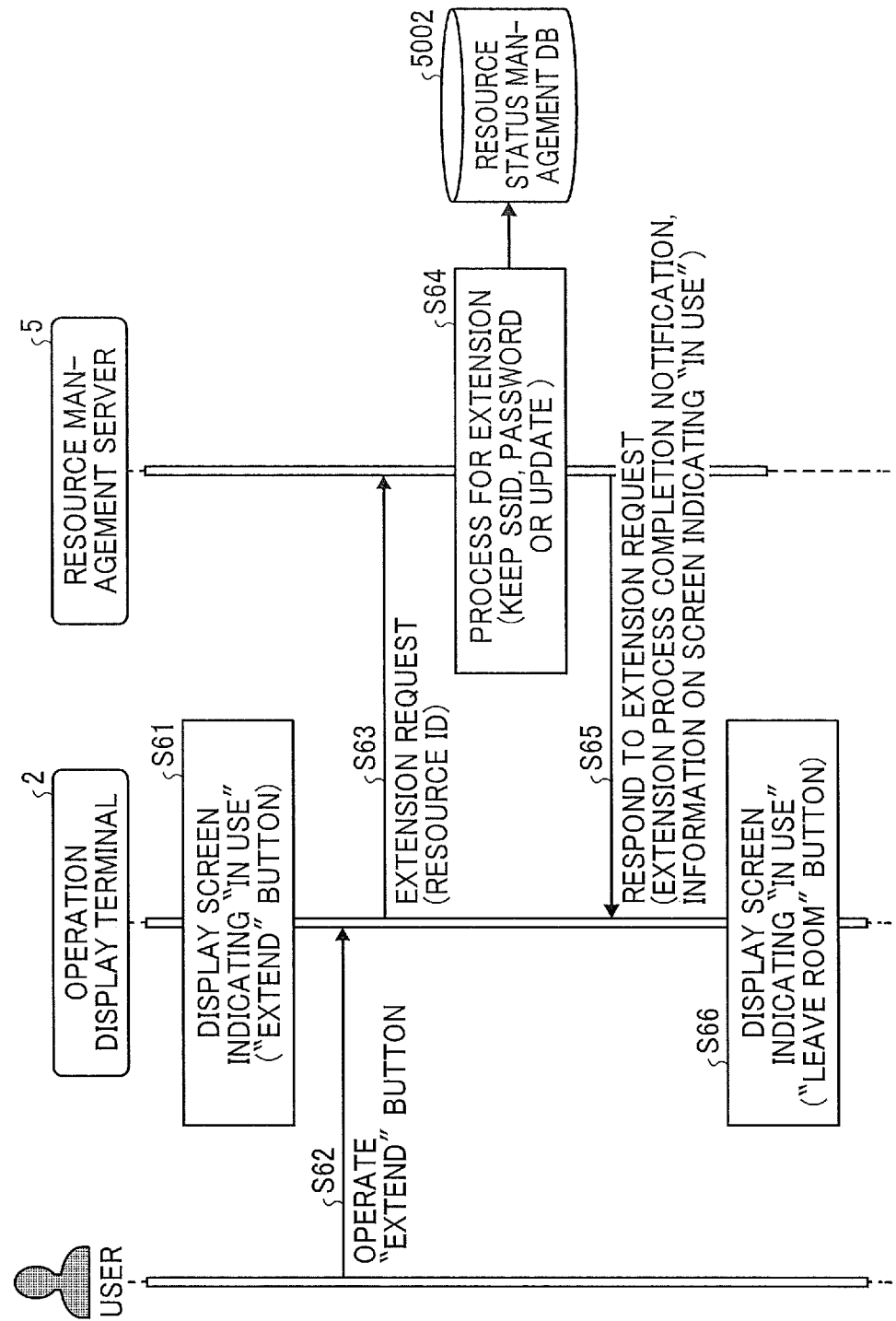
FIG. 16 is a sequence diagram illustrating an example of reservation extension process according to one or more embodiments of the present disclosure.

Reservation Extension Process:

FIG. 16 is a sequence diagram illustrating an example of reservation extension process according to the present embodiment. As illustrated in FIG. 16, the display control unit 24 of the operation display terminal 2 causes the display 218 to display the standby screen 271 as illustrated in FIG. 17 in the processing of step S54, when the event carried out with the reserved resource is extendable (step S61).

In this state, when the guest user operates the "Extend" of the operation button 274, the reception unit 22 of the operation display terminal 2 receives the operation performed by the guest user (step S62).

Subsequently, the transmission/reception unit 21 transmits an extension request to the resource management server (step S63). Thereby, the transmission/reception unit 51 of the resource management server 5 receives the extension request transmitted from the operation display terminal 2. The extension request includes the resource ID corresponding to the target reservation. When the reservation is extended, the transmission/reception unit 51 may also transmit to the reservation management server 4 information on the end date and time that is changed according to the extension among the information related to the current reservation content. Thereby, the content of the process currently being executed with the resource corresponding to the target reservation is synchronized with (match) the resource reservation content managed in the reservation management server 4. This allows other users to recognize the change in the resource reservation content and prevents another reservation from being made for a time zone corresponding to the extension.

The setting generation unit 56 of the resource management server 5 that has received the extension request maintains, or keeps, the SSID and password or updates the data (step S64). Specifically, the setting generation unit 56 records and sets a term ("extension", etc.) indicating an extension in the status of the resource status management table (see FIG. 7B) via the storing/reading unit 59.

After maintaining the S SID and password or updating the data, the transmission/reception unit 51 transmits a response to the extension request to the operation display terminal 2 (step S65). Thereby, the transmission/reception unit 21 of the operation display terminal 2 receives the response to the extension request transmitted from the resource management server 5. The response to the extension request includes information on the extension processing completion notification and information on a screen indicating "in-use" (in-use screen).

The display control unit 24 of the operation display terminal 2 displays the standby screen 261 as illustrated in FIG. 12 and displays "Leave Room" as the operation button 274 (step S66). The reason why the display control unit 24 displays "Leave Room" is that the use of the resource is terminated when the extension time expires unless the extension process is continuously performed after the extension process is once executed. When the SSID or the password is changed due to the extension, the display control unit 24 displays the changed SSID or the changed password.

Screen Example for Extending Reservation

A description is given below of an example of screen for extending the reservation. FIG. 17 is an illustration of an example of display screen displayed on the operation display terminal at a time when a reservation is extended, according to the present embodiment. The standby screen 271 as illustrated in FIG. 17 includes a current status display area 272, an event details display area 273, an operation button 274, a current time display area 275, a following-reservations display area 276, and an SSID display area 277.

In the current status display area 272, "In Use" is displayed. In addition, in the event details display area 273, "Meeting for XXX" indicating the event content, "10:00>11:00" indicating the start date and time and the end date and time of the event to be carried out, and "Ricoh Taro" indicating the reservation-making user (or the organizer) of the meeting are displayed.

As for the reservation-making user, the account included in the reservation information associated with the event may be used, or a name or a nickname of the reservation-making user may be transmitted from the resource management server 5. A photograph of the reservation-making user or an icon representing the reservation-making user may be additionally or alternatively displayed.

The operation button 274 is displayed as "Extend" and receives an operation performed by the user.

In the current time display area 275, "2020/06/15 10:34" indicating a current time is displayed. In FIG. 17, the current time is 26 minutes before the scheduled end time of "Meeting for XXX".

In the following-reservations display area 276, for example, YYY Regular Meeting, ZZZ Review meeting, etc. are displayed. The standby screen 271 indicates a start time of YYY Regular Meeting is 11:30 that is 30 minutes after the end time of "Meeting for XXX", which is displayed in the event details display area 273.

The various information displayed on the operation display terminal 2 may be generated by the operation display terminal 2 based on the reservation information, in alternative to the resource management server 5. In this case, the resource management server 5 controls the standby screen of the operation display terminal 2 by executing the browser software.

Figure 18:
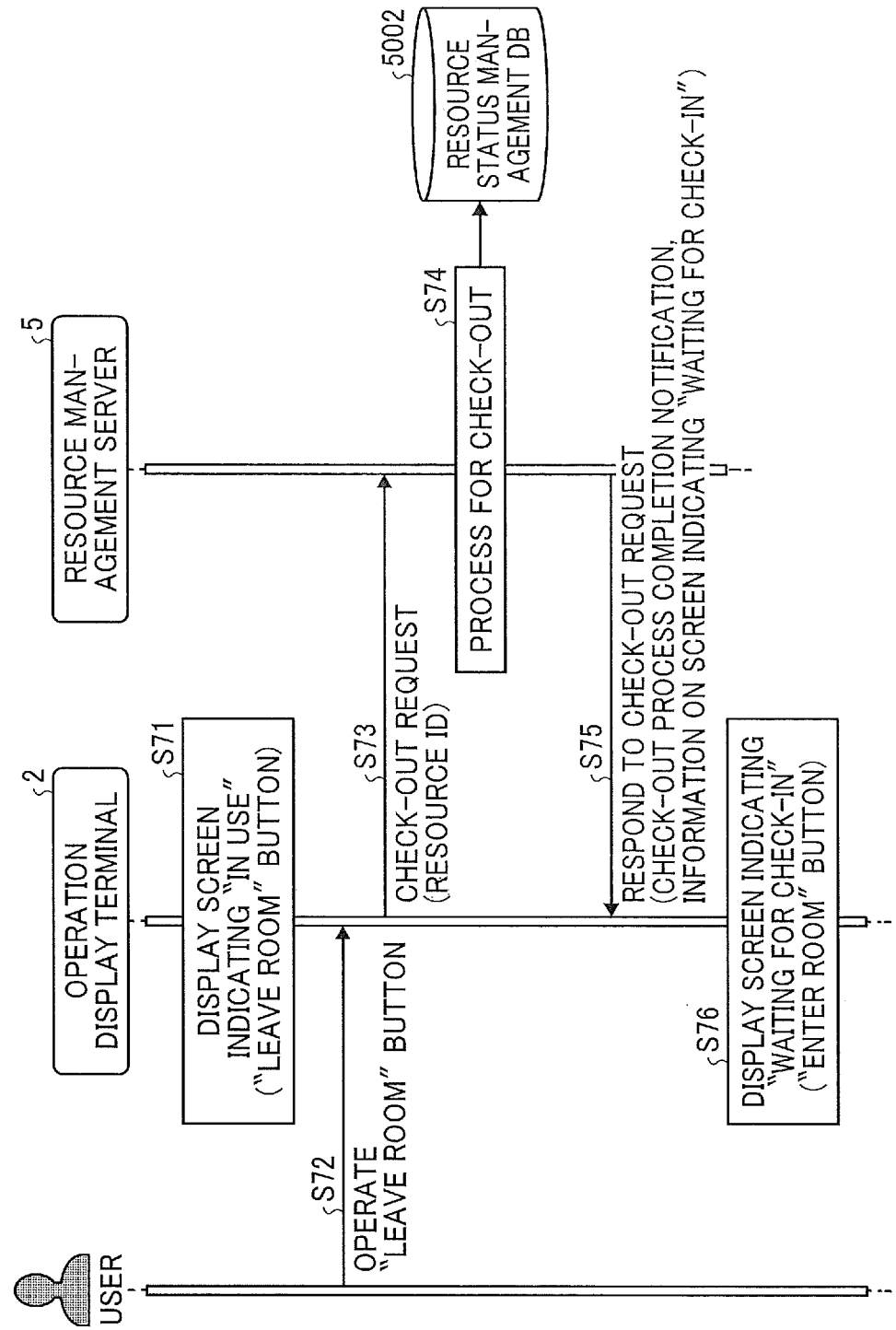
FIG. 18 is a sequence diagram illustrating an example of check-out process according to one or more embodiments of the present disclosure.

Check-Out Process:

Subsequently, the check-out process performed according to an operation of the user is described with reference to FIG. 18. FIG. 18 is a sequence diagram illustrating an example of check-out process according to the present embodiment. As illustrated in FIG. 18, the display control unit 24 of the operation display terminal 2 causes the display 218 to display the standby screen 261 as illustrated in FIG. 12 in the processing of step S54, when the event carried out with the reserved resource is not extendable (step S71).

In this state, the guest user operates "Leave Room" of the operation button 264. Thereby, the reception unit 22 of the operation display terminal 2 receives the operation for check-out performed by the guest user (step S72).

Subsequently, the transmission/reception unit 21 transmits a check-out request (leave room request) to the resource management server (step S73). Thereby, the transmission/reception unit 51 of the resource management server receives the check-out request transmitted from the operation display terminal 2. The check-out request includes the resource ID corresponding to the target reservation.

The setting generation unit 56 of the resource management server 5 that has received the check-out request performs a check-out process (step S74). Specifically, the setting generation unit 56 records and sets the check-out (checked out) in the status of the resource status management table (see FIG. 7B) via the storing/reading unit 59. The communication unit 58 transmits a deletion request signal representing a request for deleting the S SID to the wireless LAN access point 6. The setting generation unit 56 may further delete the SSID and the password from the guest network management table (see FIG. 8B). However, the present disclosure is not limited to this. The communication unit 58 may not transmit the deletion request signal indicating the request to delete the SSID to the wireless LAN access point 6, and the setting generation unit 56 may update the guest network management table (FIG. 8B) in manner that the status (usage status) is updated to indicate "VACANT".

After performing the check-out process, the transmission/reception unit 51 transmits a response to the check-out request to the operation display terminal 2 (step S75). Thereby, the transmission/reception unit 21 of the operation display terminal 2 receives the response to the checkout request transmitted from the resource management server 5. The response to the checkout request includes information on the check-out process completion notification and information on a screen indicating "waiting for entering a room (check-in).

The display control unit 24 of the operation display terminal 2 displays the standby screen 251 as illustrated in FIG. 11, displays "Enter Room" on the operation button 254, and waits for receiving an operation with respect to the following event from the guest user. (step S76). In the above-described embodiment, the case where the guest user operates the "Leave Room" of the operation button 264 is described, but when the end date and time is exceeded or a predetermined time is exceeded from the end date and time, the operation display terminal 2 or the resource management server 5 may perform the check-out process.

Screen Example after Check-Out

An example of screen after check-out is substantially the same as the example of screen at check-in described with reference to FIG. 11. Accordingly, the redundant description is omitted.

The display control of each screen in the check-in process, in the extension process, and in the check-out process, may be performed as follows. For example, when the resource management server 5 receives the reservation information of the resource or the event from the reservation management server 4, the setting generation unit 56 detects that the status is turned to checked in. The setting generation unit 56 causes the operation display terminal 2 to display "In Use" in the current status display area 262 and display the operation button 264 as "Leave Room" until the guest user checks out. In addition, the calculation unit 53 counts down the time until the end date and time of the reservation. When the guest user operates the operation button 264, which is "Leave Room", the operation display terminal 2 transmits a check-out request to the resource management server 5. In response to the check-out request, the received operation acquisition unit 52 of the resource management server 5 updates the status of the resource status management table (see FIG. 7B) to "checked out". The transmission/reception unit 51 transmits the status information to the operation display terminal 2, and the display control unit 24 displays "Vacant (Available)" or "waiting for entering a room (check-in)" in the current status display area 252.

SSID Deletion Process:

A description is given below of the SSID deletion process. The resource management server 5 according to the present embodiment deletes the SSID corresponding to the guest network according to the end date and time of each event carried out in the guest network. This surely makes the guest network, which has been temporarily available, to be unavailable. Accordingly, for example, even in case that the guest user does not perform an operation of ending the usage, the resource management server 5 monitors the end date and time of the event and causes the wireless LAN access point 6 to perform the SSID deletion process when the end date and time is exceeded or a predetermined time is exceeded from the end date and time, resulting in ensuring security. The setting generation unit 56 may further delete the SSID and the password from the guest network management table (see FIG. 8B). However, the present disclosure is not limited to this. The communication unit 58 may not transmit the deletion request signal indicating the request to delete the SSID to the wireless LAN access point 6, and the setting generation unit 56 may update the guest network management table (FIG. 8B) in manner that the status (usage status) is updated to indicate "VACANT".

As described above, according to the present embodiment, the resource management server 5 receives an additional S SID of the wireless LAN access point 6, which is transmitted by the wireless LAN access point 6 in response to a request according to the operation for entering a room and is added for executing an event associated with reservation information associated with a resource (S35) and transmits, to the operation display terminal 2, the SSID transmitted from the makes a reservation for a predetermined resource transmitted from the wireless LAN access point 6 and a corresponding password, which is associated with the SSID (S37). This achieves easy setting up for the guest network. In addition, the guest network can be used by narrowing down (separating) with time in association with the reservation content corresponding to the reserved resource, so that the minimum number of users who have reserved the resource are allowed to use the guest network, resulting in ensuring the security of the network environment.

According to one of the embodiments of the disclosure, a resource management method includes receiving reservation information transmitted from a reservation management device (corresponding to the reservation management server 4). The reservation information is information on a reservation for a resource that is managed by the reservation management device. The resource management method further includes transmitting to a communication relay device (corresponding to the wireless LAN access point 6), a request for identification information identifying the communication relay device. The communication relay device relays a communication established with another device. The resource management method includes receiving the identification information, which is transmitted from the communication relay device in response to the request. The identification information is used to execute an event associated with the reservation information. The resource management method further includes transmitting, to an operation display terminal that displays a usage status of the resource, the identification information and a password that is associated with the identification information.

With a conventional technology, a user is required to register a mobile application even when a guest network is used in a resource such as a meeting room, and this operation of registering the mobile application takes time and effort for the user.

According to the above-described embodiment of the present disclosure, when a guest network is used in a resource such as a meeting room, a resource management system that allows a user to easily use the guest network is provided.

Variations:

The above-described embodiment is illustrative and does not limit the present disclosure. Thus, numerous additional modifications and variations are possible in light of the above teachings within the scope of the present disclosure. For example, elements and/or features of different illustrative embodiments may be combined with each other and/or substituted for each other within the scope of the present disclosure. Any one of the above-described operations may be performed in various other ways, for example, in an order different from the one described above.

The resource management system 1 of the present embodiment may also be referred to as a "web service". The web service refers to various services provided by the internet-related technologies. Examples of the web service include various rental services including a meeting room rental service. A system that uses the service is called a usage system.

The resource management system 1 may also be divided into the larger number of units according to the processing contents. In addition, a single processing unit can be further divided into a plurality of processing units.

The apparatuses or devices described in each embodiment are merely one example of plural computing environments that implement one or more embodiments disclosed herein. In some embodiments, the resource management server 5 includes multiple computing devices, such as a server cluster. The plurality of computing devices is configured to communicate with each other via any type of communication link including a network, shared memory, and the like, and the processing described in the present embodiment can be performed. Similarly, the operation display terminal 2 can include a plurality of computing devices configured to communicate with each other.

Further, the resource management server 5 and the operation display terminal 2 can be configured to share the above-mentioned processing steps, for example, the steps illustrated in FIG. 9 and FIG. 13 may be shared in various combinations. For example, a process executed by one of the functional units can be executed by the resource management server 5. Similarly, another one of the functions can be executed by the operation display terminal 2. The components of the resource management server 5 and the operation display terminal 2 may be combined into one server or may be divided into a plurality of devices.

The resource management server 5 is not limited to a PC as long as being a device having a communication function. The resource management server 5 includes, for example, an output device such as an image forming apparatus (multifunction peripheral) (MFP), a projector (PJ), an interactive white board (IWB) that is a white board having an electronic whiteboard function capable of mutual communication, and a digital signage, a head up display (HUD) device, an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC and a desktop PC.

As described above, when the resource management server 5 is an MFP, for example, a guest network creation application capable of communicating with the reservation management server 4 and the operation display terminal 2 is installed in the operation unit of the MFP. Execution of the guest network creation application in conjunction with a printing function of the MFP allows the guest user to obtain a printed matter (printing medium) on which an SSID and a password are printed. With such a provision method, for example, even in case that the guest user does not use the guest network creation application executed on the operation display terminal 2, the guest network is easily provided.

Each of the functions of the embodiments described above may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The invention claimed is:

1. A resource management system, comprising:
a resource management device configured to manage a usage of a resource;
a reservation management device configured to manage a reservation for the resource; and
a communication relay device configured to communicate with the resource management device and set up a wireless local area network,
the resource management device being further configured to:
receive reservation information transmitted from the reservation management device, the reservation information being information on the reservation for the resource where an event is to be held;
transmit, to the communication relay device, an addition request signal including identification information;
receive a success signal including the identification information that permits a use of the wireless local area network, the signal being transmitted from the communication relay device in response to the addition request signal, the identification information being used to execute the event associated with the reservation information; and
transmit, to an operation display terminal that displays a usage status of the resource, the identification information and a password that is associated with the identification information,
wherein the resource includes a meeting room or a facility usable in the meeting room.

2. The resource management system of claim 1,
wherein the resource management device further
receives check-in information indicating that an operation for check-in is performed with the operation display terminal, and
transmits, in response to receiving the check-in information, the identification information and the password to the operation display terminal.

3. The resource management system of claim 1,
wherein the resource management device generates the password, which is associated with the identification information.

4. The resource management system of claim 3,
wherein the resource management device further transmits, to the communication relay device, the password, the password being included in the request to be transmitted.

5. The resource management system of claim 1,
wherein the resource management device further updates a resource status that indicates a usage status of the resource in response to receiving a check-in request in relation to the resource, the check-in request being transmitted from the operation display terminal.

6. The resource management system of claim 1,
wherein the resource management device further
determines whether the reservation is extendable based on first information and second information that are included in the reservation information, the first information indicating an end date and time of the reservation, the second information indicating a start date and time of another reservation that is associated with the resource, and
transmits, to the operation display terminal, information for prompting for one of a first operation and a second operation according to a determination result indicating whether the reservation is extendable, the first operation being for extending the reservation and the second operation being for leaving a room with respect to the reservation.

7. The resource management system of claim 1,
wherein the resource management device further transmits, to a communication terminal, the identification information and the password, the communication terminal being used by a user who uses the resource.

8. A resource management device, comprising circuitry configured to:
manage usage of a resource;
communicate with a reservation management device and a communication relay device, the reservation management device managing a reservation for the resource, the communication relay device relaying a communication established between the resource management device and another device and setting up a wireless local area network;
receive reservation information transmitted from the reservation management device, the reservation information being information on the reservation for the resource where an event is to be held;
transmit, to the communication relay device, an addition request signal including identification information;
receive a success signal including the identification information that permits a use of the wireless local area network, the signal being transmitted from the communication relay device in response to the addition request signal, the identification information being used to execute the event associated with the reservation information; and
transmit, to an operation display terminal that displays a usage status of the resource, the identification information and a password that is associated with the identification information,
wherein the resource includes a meeting room or a facility usable in the meeting room.

9. A non-transitory recording medium storing a plurality of instructions which,
when executed by one or more processors, causes the processors to perform a method, the method comprising:
receiving reservation information transmitted from a reservation management device, the reservation information being information on a reservation for a resource, the reservation management device managing the reservation for the resource where an event is to be held;
transmitting, to a communication relay device, an addition request signal including identification information, the communication relay device relaying a communication established with another device;
receiving a success signal including the identification information that permits a use of the wireless local area network, the signal being transmitted from the communication relay device in response to the addition request signal, the identification information being used to execute the event associated with the reservation information; and
transmitting, to an operation display terminal that displays a usage status of the resource, the identification information and a password that is associated with the identification information,
wherein the resource includes a meeting room or a facility usable in the meeting room.

* * * * *